US012707440B2

(12) United States Patent
Nakano et al.

(10) Patent No.: US 12,707,440 B2
(45) Date of Patent: Aug. 11, 2026

(54) TERMINAL AND COMMUNICATION METHOD

(71) Applicant: Panasonic Intellectual Property Corporation of America, Torrance, CA (US)

(72) Inventors: Takayuki Nakano, Ishikawa (JP); Takashi Iwai, Ishikawa (JP); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 614 days.

(21) Appl. No.: 17/910,740

(22) PCT Filed: Jan. 19, 2021

(86) PCT No.: PCT/JP2021/001575

§ 371 (c)(1),
(2) Date: Sep. 9, 2022

(87) PCT Pub. No.: WO2021/181889

PCT Pub. Date: Sep. 16, 2021

(65) Prior Publication Data

US 2023/0156678 A1 May 18, 2023

(30) Foreign Application Priority Data

Mar. 13, 2020 (JP) ................................ 2020-044072

(51) Int. Cl.
*H04W 72/0453* (2023.01)
*H04W 84/12* (2009.01)

(52) U.S. Cl.
CPC ........ *H04W 72/0453* (2013.01); *H04W 84/12* (2013.01)

(58) Field of Classification Search
CPC . H04W 72/0453; H04W 84/12; H04W 72/53; H04W 72/535
See application file for complete search history.

(56) References Cited

U.S. PATENT DOCUMENTS 10,404,425 B2 9/2019 Adachi et al.
10,516,512 B2 * 12/2019 Choi .................... H04L 5/0037
2016/0262157 A1 9/2016 Kim et al.
(Continued)

FOREIGN PATENT DOCUMENTS

CN 110768757 A 2/2020
EP 3606255 A1 2/2020
(Continued)

OTHER PUBLICATIONS

Extended European Search Report, dated Aug. 17, 2023 for European Patent Application No. 21767884.6-1215 (12 pages) .
(Continued)

*Primary Examiner* — Habte Mered
(74) *Attorney, Agent, or Firm* — Seed Intellectual Property Law Group LLP

(57) ABSTRACT

This terminal comprises: a receiving circuit which receives first information on a plurality of resource units in a resource assignment candidate; and a control circuit which controls communication using the resource units on the basis of the first information.

12 Claims, 22 Drawing Sheets

(56) References Cited

U.S. PATENT DOCUMENTS

| | | | | |
|---|---|---|---|---|
| 2017/0295554 | A1 | 10/2017 | Lee et al. | |
| 2019/0081769 | A1 | 3/2019 | Zhang et al. | |
| 2019/0238288 | A1 | 8/2019 | Liu et al. | |
| 2019/0349067 | A1 | 11/2019 | Huang et al. | |
| 2020/0146052 | A1 | 5/2020 | Iwai et al. | |
| 2020/0177425 | A1* | 6/2020 | Chen | H04L 27/2602 |
| 2021/0143966 | A1 | 5/2021 | Yu et al. | |
| 2021/0153225 | A1 | 5/2021 | Pang et al. | |
| 2021/0282146 | A1* | 9/2021 | Kim | H04L 5/0094 |
| 2022/0345275 | A1* | 10/2022 | Hu | H04L 5/0053 |
| 2022/0353865 | A1* | 11/2022 | Yang | H04L 5/0053 |
| 2023/0362910 | A1* | 11/2023 | Yang | H04W 72/0453 |

FOREIGN PATENT DOCUMENTS

| | | | |
|---|---|---|---|
| JP | 2017055314 | A | 3/2017 |
| JP | 2019515600 | A | 6/2019 |
| JP | 6605024 | B2 | 11/2019 |
| KR | 10-2017-0118127 | A | 10/2017 |
| KR | 10-2019-0117479 | A | 10/2019 |
| WO | WO 2019192683 | A1 | 10/2019 |

OTHER PUBLICATIONS

IEEE Computer Society, “Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN” 802.11 Working Group, LAN/MAN Standards Committee, IEEE P802.11aX/D1.2, Apr. 2017. (488 pages).

IEEE Computer Society, “Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN,” 802.11 Working Group, LAN/MAN Standards Committee, IEEE P802.11ax/D6.0, Nov. 2019. (780 pages).

International Search Report, mailed Apr. 27, 2021, for the corresponding International Patent Application No. PCT/JP2021/001575. (6 pages) (with English translation).

Liu et al., “Multiple RU Combinations for EHT,” Mediatek, IEEE 802.11-19/1907r2, Jan. 12, 2019. (32 pages).

Park et al., “Multiple RU Aggregation,” LG Electronics, IEEE 802.11-20/0023r2, Jan. 13, 2020. (26 pages).

Porat et al., “Multi-RU Support,” Broadcom, IEEE 802.11-19/1908r4, Jan. 16, 2020. (25 pages).

Redlich et al., “Discussion on Multi-RU in 802.11be,” Huawei, IEEE 802.11-20-0128-01-00be, Jan. 2020. (33 pages).

Yu et al., “Multiple RU discussion,” Huawei, IEEE 802.11-19/1914r4, Jan. 6, 2019. (10 pages).

Huang et al., “Signaling Support for Multi-RU Assignment,” doc .: IEEE 802.11-19/1868r2, Panasonic Corporation, Jan. 8, 2020. (12 pages).

Communication pursuant to Article 94(3) EPC, dated Mar. 12, 2026, for European Patent Application No. 21767884.6. (7 pages).

* cited by examiner

Table 27-26—RU Allocation subfield

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 (00000000) | 26 | 26 | 26 | 26 | 26 | 26 | 26 | 26 | 26 | 1 |
| 1 (00000001) | 26 | 26 | 26 | 26 | 26 | 26 | 26 | 52 | | 1 |
| 2 (00000010) | 26 | 26 | 26 | 26 | 26 | 52 | | 26 | 26 | 1 |
| 3 (00000011) | 26 | 26 | 26 | 26 | 26 | 52 | | 52 | | 1 |
| 4 (00000100) | 26 | 26 | 52 | | 26 | 26 | 26 | 26 | 26 | 1 |
| 5 (00000101) | 26 | 26 | 52 | | 26 | 26 | 26 | 52 | | 1 |
| 6 (00000110) | 26 | 26 | 52 | | 26 | 52 | | 26 | 26 | 1 |
| 7 (00000111) | 26 | 26 | 52 | | 26 | 52 | | 52 | | 1 |
| 8 (00001000) | 52 | | 26 | 26 | 26 | 26 | 26 | 26 | 26 | 1 |

STA1 STA2 ... STA8

FIG. 2

Table 9-31h—B7–B1 of the RU Allocation subfield

| B7-B1 of the RU Allocation subfield | UL BW subfield | RU size | RU Index |
|---|---|---|---|
| 0–8 | 20 MHz, 40 MHz, 80 MHz, 80+80 MHz or 160 MHz | 26 | RU1 to RU9, respectively |
| 9–17 | 40 MHz, 80 MHz, 80+80 MHz or 160 MHz | | RU10 to RU18, respectively |
| 18–36 | 80 MHz, 80+80 MHz or 160 MHz | | RU19 to RU37, respectively |
| 37–40 | 20 MHz, 40 MHz, 80 MHz, 80+80 MHz or 160 MHz | 52 | RU1 to RU4, respectively |
| 41–44 | 40 MHz, 80 MHz, 80+80 MHz or 160 MHz | | RU5 to RU8, respectively |
| 45–52 | 80 MHz, 80+80 MHz or 160 MHz | | RU9 to RU16, respectively |
| 53, 54 | 20 MHz, 40 MHz, 80 MHz, 80+80 MHz or 160 MHz | 106 | RU1 and RU2, respectively |
| 55, 56 | 40 MHz, 80 MHz, 80+80 MHz or 160 MHz | | RU3 and RU4, respectively |
| 57–60 | 80 MHz, 80+80 MHz or 160 MHz | | RU5 to RU8, respectively |
| 61 | 20 MHz, 40 MHz, 80 MHz, 80+80 MHz or 160 MHz | 242 | RU1 |
| 62 | 40 MHz, 80 MHz, 80+80 MHz or 160 MHz | | RU2 |
| 63, 64 | 80 MHz, 80+80 MHz or 160 MHz | | RU3 and RU4, respectively |

FIG. 4

Table 27-26—RU Allocation subfield

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 (00000000) | 26 | 26 | 26 | 26 | 26 | 26 | 26 | 26 | 26 | 1 |
| 1 (00000001) | 26 | 26 | 26 | 26 | 26 | 26 | 26 | 52 | | 1 |
| 2 (00000010) | 26 | 26 | 26 | 26 | 26 | 52 | | 26 | 26 | 1 |
| 3 (00000011) | 26 | 26 | 26 | 26 | 26 | 52 | | 52 | | 1 |
| 4 (00000100) | 26 | 26 | 52 | | 26 | 26 | 26 | 26 | 26 | 1 |
| 5 (00000101) | 26 | 26 | 52 | | 26 | 26 | 26 | 52 | | 1 |
| 6 (00000110) | 26 | 26 | 52 | | 26 | 52 | | 26 | 26 | 1 |
| 7 (00000111) | 26 | 26 | 52 | | 26 | 52 | | 52 | | 1 |
| 8 (00001000) | 52 | | 26 | 26 | 26 | 26 | 26 | 26 | 26 | 1 |

100

200

| Case | RU combination number |
|---|---|
| 1 | 1 |
| 2 | 2 |

Table 27-26—RU Allocation subfield (continued)

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| [illegible] | 52 | | 52 | | 26 | 106 | | | | 8 |
| [illegible] | 106 | | | | 26 | 26 | 26 | 26 | 26 | 8 |
| [illegible] | 106 | | | | 26 | 26 | 26 | 52 | | 8 |
| [illegible] | 106 | | | | 26 | 52 | | 26 | 26 | 8 |
| [illegible] | 106 | | | | 26 | 52 | | 52 | | 8 |
| [illegible] | 106 | | | | – | 106 | | | | 16 |
| [illegible] | 52 | | 52 | | – | 52 | | 52 | | 1 |
| [illegible] | [illegible] | | | | | | | | | 1 |
| [illegible] | [illegible] | | | | | | | | | 1 |
| [illegible] | [illegible] | | | | | | | | | 1 |
| [illegible] | Reserved | | | | | | | | | 4 |
| [illegible] | Reserved | | | | | | | | | 8 |
| [illegible] | 106 | | | | 26 | 106 | | | | 64 |
| [illegible] | 242 | | | | | | | | | 8 |
| [illegible] | 484 | | | | | | | | | 8 |
| [illegible] | 996 | | | | | | | | | 8 |
| [illegible] | Reserved | | | | | | | | | 8 |
| [illegible] | Reserved | | | | | | | | | 32 |

Undefined 52 entries

| 116 (1110100) | – | 26-A | 52-A | – | 52-B | 26-B | – | 1 |
|---|---|---|---|---|---|---|---|---|
| 117 (11101001) | – | 26-A | 52-B | – | 52-A | 26-B | – | 1 |

⋮

| 216 (11011000) | – | 242-A | 484-A | 8 |
|---|---|---|---|---|
| 217 (11011001) | 242-A | – | 484-A | 8 |

| Case | Allocation RUs# for STA 1 | Allocation RUs# for STA 2 |
|---|---|---|
| 1 | 2, 3 | 5, 6 |
| 2 | 2, 5 | 3, 6 |

| RU assignment tabular number | RU#1 | RU#2 | RU#3 | RU#4 | RU#5 | RU#6 | RU#7 |
|---|---|---|---|---|---|---|---|
| 0 | User1 | User2 | User3 | User4 | User5 | User6 | User7 |
| 1 | – | User1 | User1 | – | User2 | User2 | – |
| 2 | – | User1 | User2 | – | User1 | User2 | – |
| 3 | | | | … | | | |

| Element | Range | Example settings |
| --- | --- | --- |
| Starting RU_1 | 1~9 | 2 |
| Ending RU_1 (or RU length_1) ※ | 1~9 | 3(2) |
| Starting RU_2 | 1~9 | 7 |
| Ending RU_2 (or RU length_2) ※ | 1~9 | 7(1) |

TERMINAL AND COMMUNICATION METHOD

TECHNICAL FIELD

The present disclosure relates to a terminal and a communication method.

BACKGROUND ART

Studies have been carried out on the Institute of Electrical and Electronics Engineers (IEEE) 802.11be standard for the next generation radio Local Area Network (LAN), which is the successor to the IEEE 802.11ax standard of IEEE 802.11. The IEEE 802.11be is also referred to as Extream High Throughput (EHT), for example.

CITATION LIST

Non Patent Literatures

NPL 1
IEEE 802.11-19/1907r2, Multiple RU combinations for EHT
NPL 2
IEEE 802.11-19/1914r4, Multiple RU discussion
NPL 3
IEEE 802.11-20/0023r2, Multiple RU aggregation
NPL 4
IEEE 802.11-19/1908r4, Multi-RU support
NPL 5
IEEE P802.11axTM/D6.0

SUMMARY OF INVENTION

However, there is scope for further study on a method of allocating a frequency resource in radio communication in a wireless LAN or the like.

One non-limiting and exemplary embodiment facilitates providing a terminal and a communication method each capable of improving the allocation efficiency for a frequency resource.

A terminal according to an exemplary embodiment of the present disclosure includes: reception circuitry, which, in operation, receives first information on a plurality of resource units in resource assignment candidates, and control circuitry, which, in operation, controls communication using at least one of the plurality of resource units, based on the first information.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve the allocation efficiency for a frequency resource.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates an example of Resource unit (RU) Allocation;

FIG. 4 illustrates another example of RU Allocation;

FIG. 19 illustrates an example of RU Allocation according to Method 6;

DESCRIPTION OF EMBODIMENTS

Hereinafter, embodiments of the present disclosure will be described in detail with reference to the accompanying drawings.

In IEEE 802.11be, for example, in Orthogonal Frequency Division Multiple Access (OFDMA) transmission, a method has been discussed for allocating, to one STA (also referred to as a Station or a terminal), a plurality of Resource Units (RUs) in contiguous or non-contiguous frequency domains ((e.g., see Non-Patent Literatures (hereinafter referred to as "NPL(s)") 1 to 4). With this RU allocation, the frequency utilization efficiency can be improved.

In IEEE 802.11ax, for example, contiguous allocation of RU is possible in the frequency domain while non-contiguous RU allocation is not supported. Further, in IEEE 802.11ax, for example, a method for indicating information on the RU allocation differs between the downlink (DL) OFDMA and the uplink (UL) OFDMA (e.g., see NPL 5).

Figure 1:
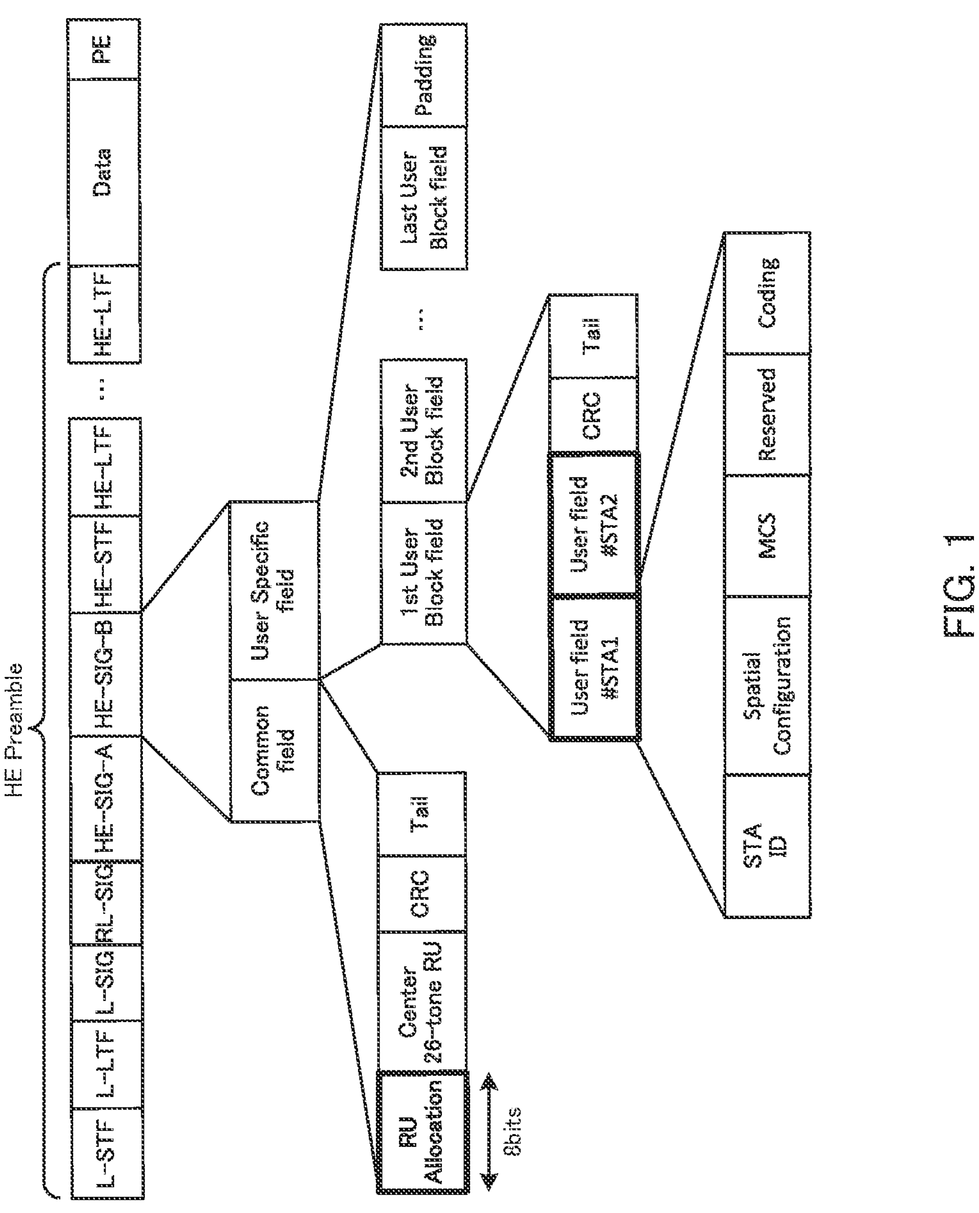
FIG. 1 illustrates an exemplary signaling format for a Downlink (DL) Orthogonal Frequency Division Multiple Access (OFDMA)

In one example, FIG. 1 illustrates an exemplary signaling format for the DL OFDMA in IEEE 802 11ax.

As illustrated in FIG. 1, the information on the RU allocation is indicated in, for example, the Common field including common information shared by a plurality of users (or STAs) in the HE-SIG-B field of the High Efficiency (HE) preamble. Further, in FIG. 1, one RU is allocated to one STA based on the information on the RU allocation. For example, the Common field in HE-SIG-B field may include the RU Allocation subfield. The RU Allocation subfield may include, for example, the RU allocation information shared by a plurality of STAs subject to the allocation. For example, the RU Allocation subfield may indicate information on a size of RU and a position of RU in the frequency domain (in other words, information on configuration of RU). Further, for example, as illustrated in FIG. 1, RU that has been indicated in the RU Allocation subfield may be allocated according to the order of User fields corresponding to STAs, which are included in the User Specific field including user specific information that is specific to each of a plurality of users (or STAs) in the HE-SIG-B field. Incidentally, the configuration of RU may be replaced with, for example, "setting of RU."

FIG. 2 illustrates an example of information on a size of RU and a position of RU in the frequency domain indicated in the RU Allocation subfield in the HE preamble. For example, in a case where a value included in the RU Allocation subfield illustrated in FIG. 1 is 8 (binary digits: 00001000), eight RUs including RU of 52 tones (e.g., RU composed of RU #1 and RU #2; hereinafter may be also referred to as 52-toneRU) and RUs of 26 tones (RUs respectively composed of RU #3 to RU #9; hereinafter may be also referred to as 26-tone RU) may be allocated to a plurality of STAs. Further, for example, 52-tone RU illustrated in FIG. 2 may be allocated to STA 1 while 26-tone RU (RU #3) may be allocated to STA 2, based on the order of User fields corresponding to STAs included in the User Specific field (e.g., in FIG. 1, STA 1 and STA 2 in this order). Similarly, in a case where the value included in the RU Allocation subfield is 8, RU may be allocated to another STA (e.g., STA 8).

Figure 3:
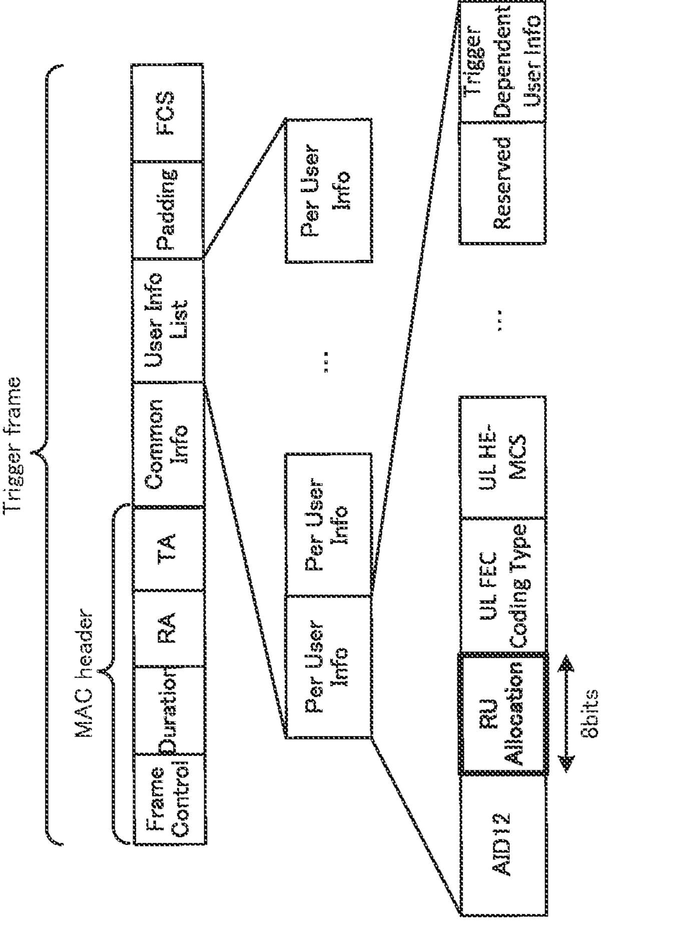
FIG. 3 illustrates an exemplary format of a Trigger frame.

FIG. 3 illustrates an exemplary signaling format for the UL OFDMA in IEEE 802 11ax.

As illustrated in FIG. 3, the information on the RU allocation is indicated in the RU Allocation subfield in the Per User Info field that is a STA-specific field within the User Info List field of the Trigger frame. In the UL OFDMA, for example, a plurality of contiguous RUs can be allocated to one STA. FIG. 4 illustrates an example of information on a size of RU and a position of RU in the frequency domain (i.e., information on configuration of RU), which is indicated in the RU Allocation subfield of the Trigger frame. For example, one RU may be designated to STA by the granularity (in other words, RU size) of 26 tones or more within 80 MHz.

Figure 5:
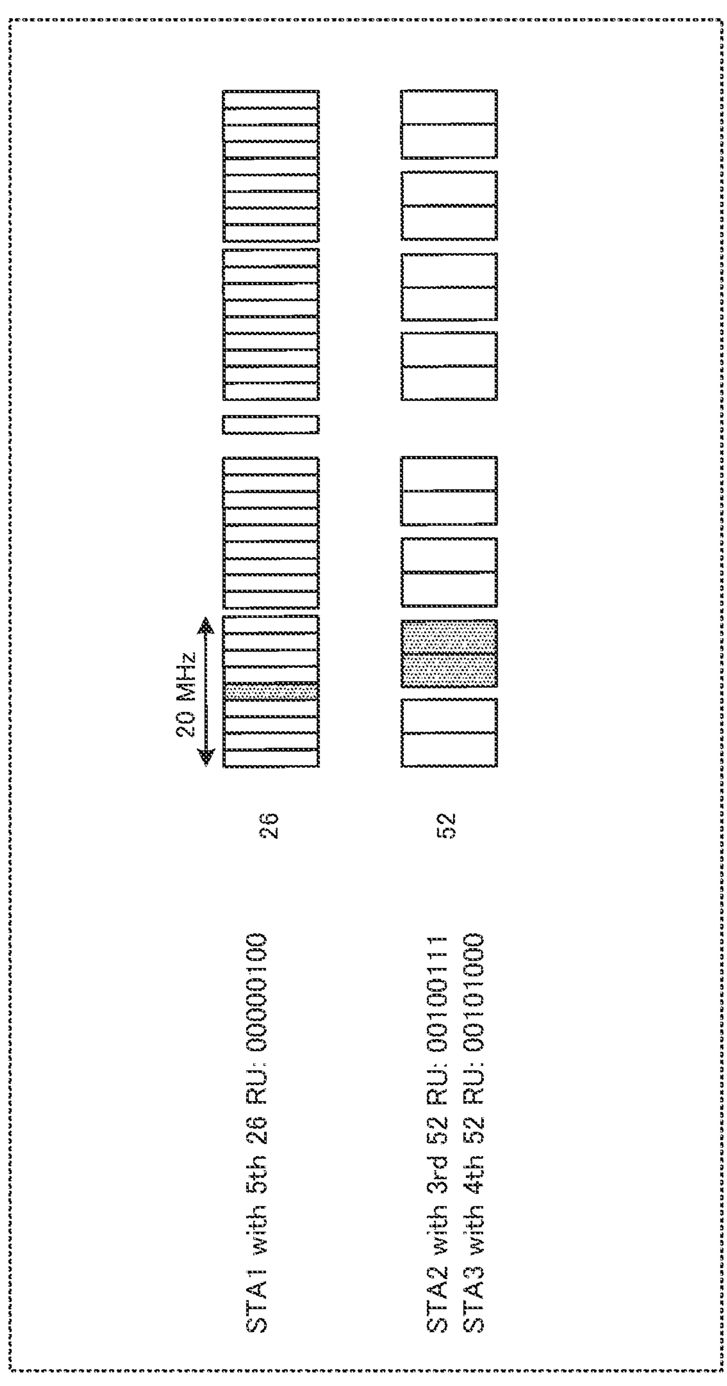
FIG. 5 illustrates an assignment example of RU for Uplink (UL) OFDMA.

For example, as illustrated in FIG. 5, in a case where 4 (binary digits: 00000100) is indicated to STA 1 in the RU Allocation subfield, the fifth 26-tone RU may be allocated to STA 1. Further, for example, as illustrated in FIG. 5, in a case where 39 (binary digits: 00100111) is indicated to STA 2 in the RU Allocation subfield, the third 52-tone RU may be allocated to STA 2. Similarly, for example, as illustrated in FIG. 5, in a case where 40 (binary digits: 00101000) is indicated to STA 3 in the RU Allocation subfield, the fourth 52-tone RU may be allocated to STA 3.

A description has been given of the methods for indicating the information on the RU allocation in DL and UL in IEEE 802 11ax.

Figure 6:
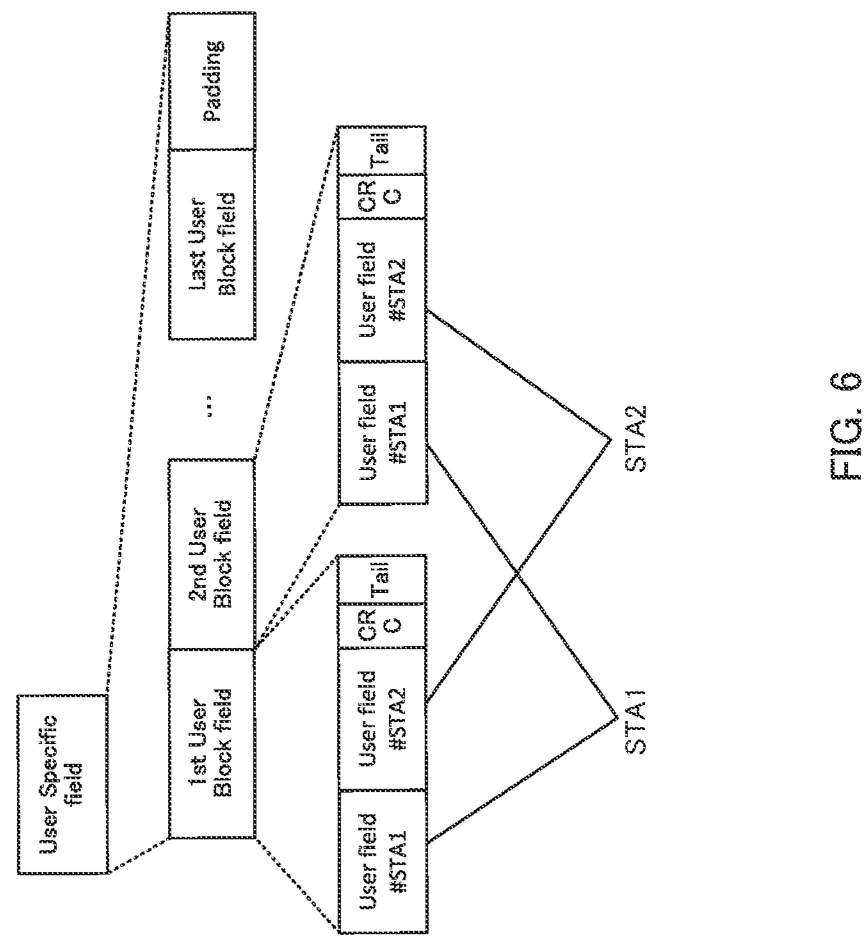
FIG. 6 illustrates an assignment example of RU.

Here, for example, a method for assigning a plurality of RUs to one STA based on the signaling format of IEEE 802 11ax (for example, FIG. 1) will be described. FIG. 6 illustrates an exemplary User Specific field format in the method.

Figure 7:
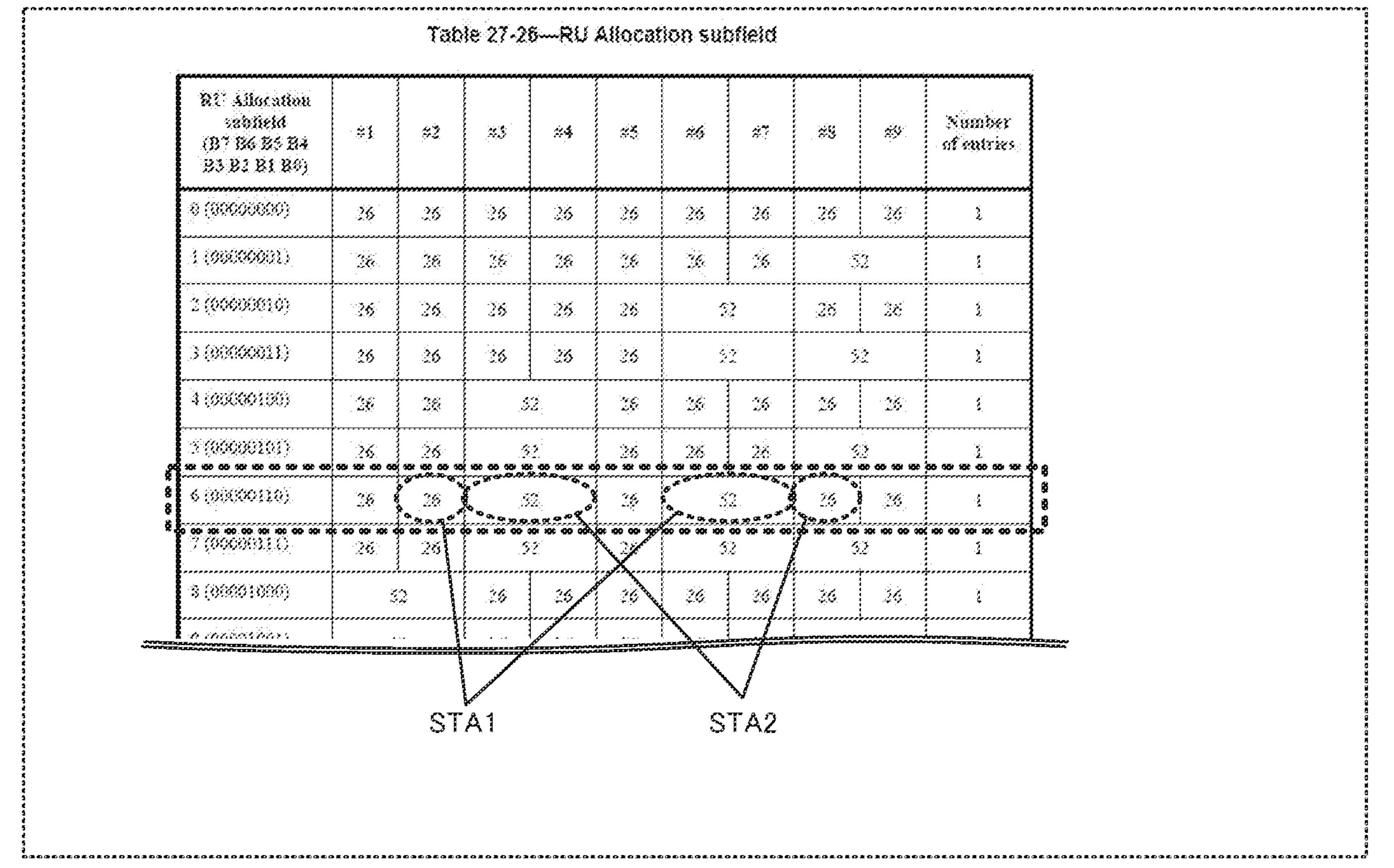
FIG. 7 illustrates still another example of RU Allocation.

For example, identical identification information for a single STA (e.g., STA ID in DL, association identifier (AID) in UL) may be set to a plurality of User fields (e.g., see NPL 2). By way of example, the User Specific field illustrated in FIG. 6 includes two User fields corresponding to STA 1 and two User fields corresponding to STA 2. Further, for example, as illustrated in FIG. 7, when RU Allocation subfield=6 (binary digits: 00000110) in the HE preamble is indicated, RUs may be allocated to STA 1, STA 2, STA 1, and STA 2 in this order, based on the User Specific fields illustrated in FIG. 6. In this method described above, a plurality of RUs can be allocated to one STA. For example, in FIG. 7, two non-contiguous RUs can be allocated to each STA.

In this method, however, the amount of signaling per STA may be increased because a plurality of User fields is configured for one STA to which a plurality of RUs is allocated. For example, increasing the signaling amount per STA may cause an increase in overhead, which results in a reduction in throughput. In one User Block field illustrated in FIG. 1 or 6, for example, a User field is composed of 21 bits, a Cyclic Redundancy Check (CRC) field is composed of four bits, and a tail bit field is composed of six bits. In other words, one User Block field illustrated in FIG. 1 or FIG. 6 can be composed of at least 31 bits. Therefore, for example, as illustrated in FIG. 6, when two or more User fields are configured for one STA, the signaling amount may be increased by at least 31 bits as compared to the format in IEEE 802 11 ax (for example, FIG. 1).

Accordingly, in one exemplary embodiment of the present disclosure, a description will be given of methods for allocating a plurality of RUs to one STA while suppressing an increase in the signaling amount.

Embodiment 1

[Configuration of Radio Communication System]

A radio communication system according to the present embodiment includes at least one AP 100 and at least one STA 200.

Figure 8:
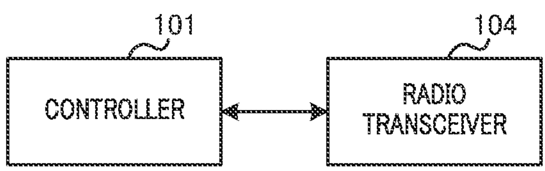
FIG. 8 is a block diagram illustrating a configuration example of part of an access point (AP) according to Embodiment 1.

FIG. 8 is a block diagram illustrating a configuration example of part of AP 100 according to an exemplary embodiment of the present disclosure. In AP 100 illustrated in FIG. 8, radio transceiver 104 (e.g., corresponding to transmission circuitry) transmits first information (e.g., RU assignment information to be described later) regarding a plurality of RUs for one terminal (e.g., STA 200) in resource assignment candidates (e.g., RU candidates). Controller 101 controls, based on the first information, the communication using RU.

Figure 9:
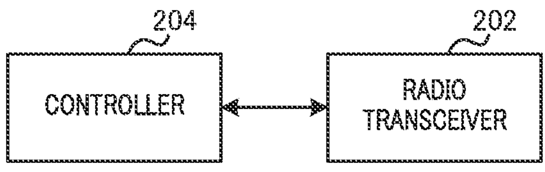
FIG. 9 is a block diagram illustrating a configuration example of part of a station (STA) according to Embodiment 1.

FIG. 9 is a block diagram illustrating a configuration example of part of STA 200 according to an exemplary embodiment of the present disclosure. In STA 200 illustrated in FIG. 9, radio transceiver 202 (e.g., corresponding to reception circuitry) receives first information (e.g., RU assignment information to be described later) on a plurality of RUs for one terminal (e.g., STA 200) in resource assignment candidates (e.g., RU candidates). Controller 204 (e.g., corresponding to control circuitry) controls, based on the first information, the communication using RU.

<Configuration Example of AP 100>

Figure 10:
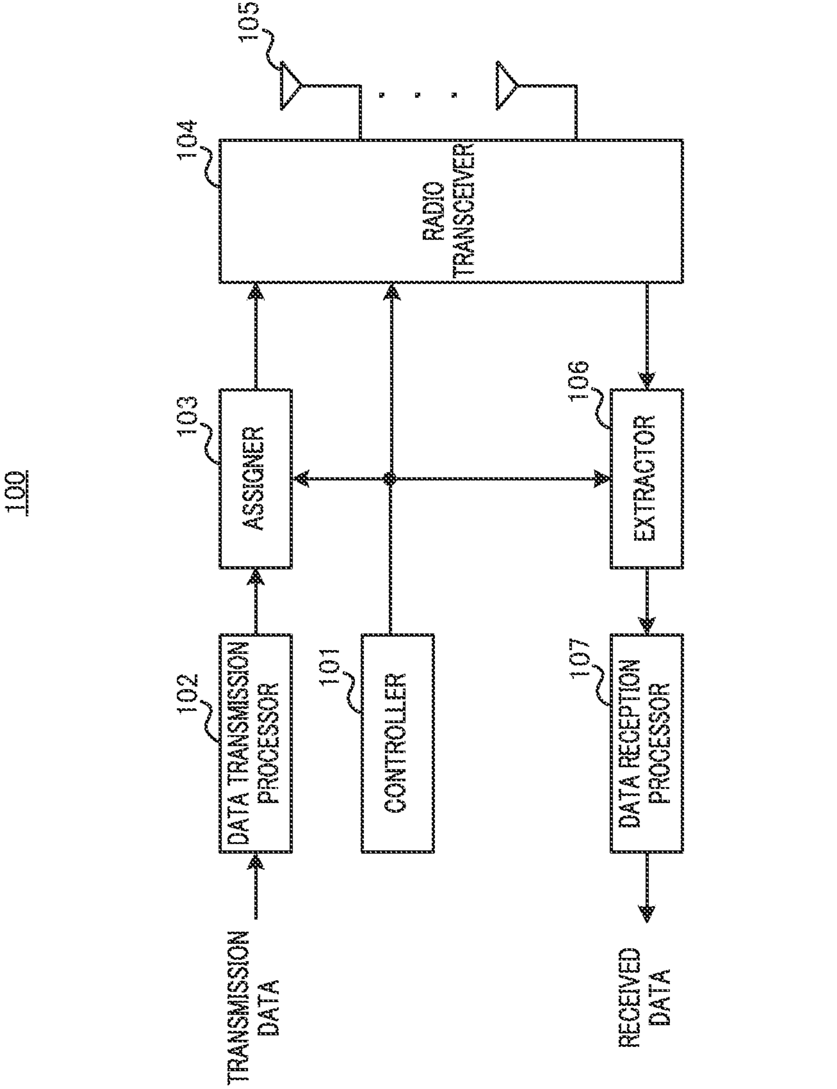
FIG. 10 is a block diagram illustrating a configuration example of the AP according to Embodiment 1.

FIG. 10 is a block diagram illustrating a configuration example of AP 100. AP 100 illustrated in FIG. 10 includes, for example, controller 101, data transmission processor 102, assigner 103, radio transceiver 104, antenna 105, extractor 106, and data reception processor 107.

Controller 101 may perform scheduling for STA 200 in at least one of DL and UL, for example. Controller 101, for example, may determine a parameter such as the number of STAs 200 to which a resource (e.g., RU) is allocated (e.g., number of multiplexes), a frequency bandwidth, or frequency resources to be allocated to each STA 200. Controller 101 may generate, based on the determined parameter, for example, a control signal (e.g., preamble) that indicates, to STA 200, reception of a downlink signal. Controller 101 may also generate, based on the determined parameter, a control signal (e.g., Trigger frame) that indicates, to STA 200, transmission of an uplink signal.

Note that, an example of an assignment method of RU will be described later.

Controller 101, for example, outputs the generated control signal (e.g., EHT preamble or Trigger frame) to radio transceiver 104. Additionally, controller 101, for example, may output information on resource assignment of downlink data to assigner 103 and output information on resource assignment of uplink data to extractor 106.

Data transmission processor 102, for example, performs transmission processing such as encoding and modulation on transmitted data to be input (e.g., downlink data) and outputs the data signal resulting from the transmission processing to assigner 103.

Assigner 103, for example, assigns (i.e., maps) the data signal input from data transmission processor 102 to a resource (e.g., RU), based on the information on the resource assignment of the downlink data input from controller 101, and outputs the mapped signal to radio transceiver 104.

Radio transceiver 104, for example, performs communication with STA 200. In one example, radio transceiver 104 performs radio transmission processing on the data signal input from assigner 103 (e.g., downlink data) or the control signal input from controller 101 (e.g., preamble or Trigger frame), and transmits a radio signal from antenna 105. For example, radio transceiver 104 may multiplex (e.g., perform time division multiplexing of) the data signal and the control signal (e.g., preamble).

Further, for example, radio transceiver 104 performs radio reception processing on a radio signal received by antenna 105 and outputs the received signal resulting from the radio reception processing to extractor 106.

Extractor 106, for example, extracts, based on the information on the resource assignment of the uplink data input from controller 101, a received data signal corresponding to each STA 200 from the received signal input from radio transceiver 104, and outputs the received data signal to data reception processor 107.

Data reception processor 107, for example, may perform reception processing such as demodulation and decoding on the received data signal input from extractor 106, and output the signal (e.g., received data) resulting from the reception processing.

<Configuration Example of STA 200>

Figure 11:
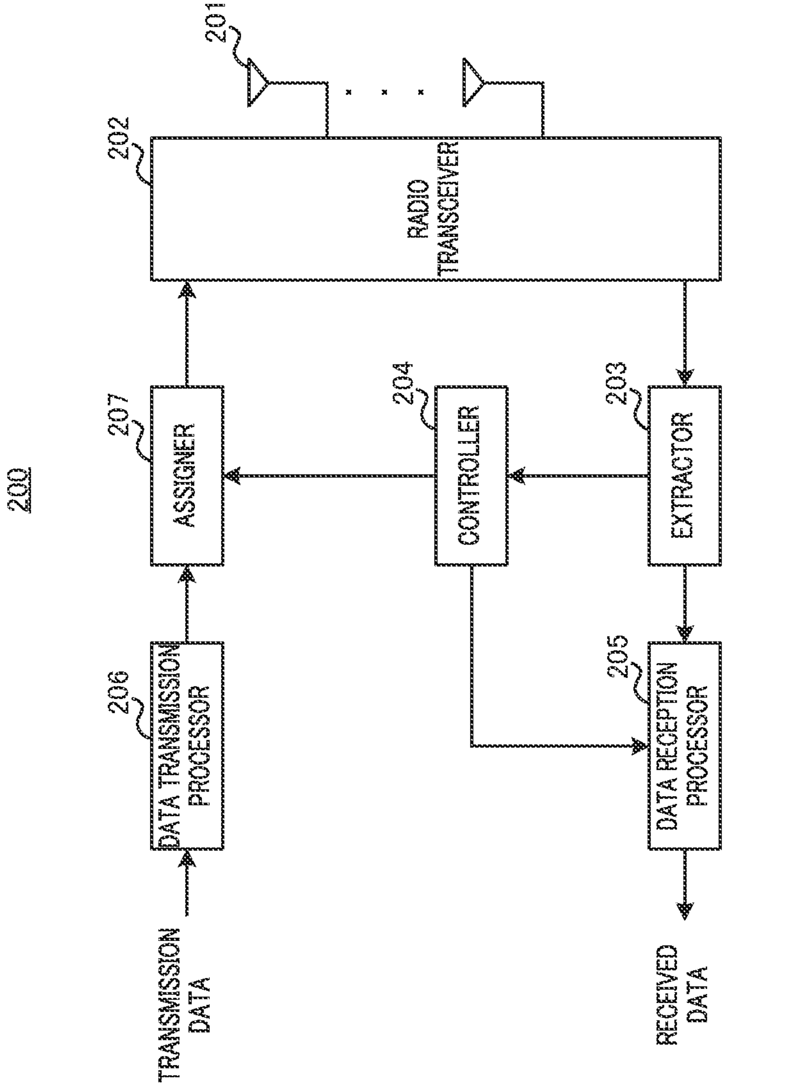
FIG. 11 is a block diagram illustrating a configuration example of the STA according to Embodiment 1.

FIG. 11 is a block diagram illustrating a configuration example of STA 200. STA 200 illustrated in FIG. 11 includes, for example, antenna 201, radio transceiver 202, extractor 203, controller 204, data reception processor 205, data transmission processor 206, and assigner 207.

Radio transceiver 202 performs communication with AP 100, for example. Radio transceiver 202 performs radio reception processing on a radio signal received by antenna 201 and outputs the received signal resulting from the radio reception processing to extractor 203. Further, for example, radio transceiver 202 performs radio transmission processing on a data signal input from assigner 207 (e.g., uplink data) and transmits a radio signal from antenna 201.

Extractor 203, for example, extracts (i.e., detects) a control signal (e.g., preamble or Trigger frame) from the received signal input from radio transceiver 202, and outputs the control signal to controller 204. Further, extractor 203, for example, extracts a data part from the received signal and outputs the data part to data reception processor 205.

Controller 204, for example, determines a resource (e.g., RU) assigned to the downlink data for STA 200 or a resource (e.g., RU) assigned to the uplink data for STA 200, based on the control signal input from extractor 203. For example, controller 204 may output information on resource assignment of the downlink data to data reception processor 205 and output information on resource assignment of the uplink data to assigner 207.

Incidentally, an example of an assignment method of RU will be described later.

Data reception processor 205, for example, extracts, based on the information on the resource assignment of the downlink data input from controller 204, a signal addressed to STA 200 from the data part input from extractor 203. Data reception processor 205 then may perform reception processing such as demodulation and decoding on the extracted signal and output the signal (e.g., received data) resulting from the reception processing.

Data transmission processor 206, for example, performs transmission processing such as encoding and modulation on transmitted data to be input (e.g., uplink data) and outputs the data signal resulting from the transmission processing to assigner 207.

Assigner 207, for example, assigns (i.e., maps) the data signal input from data transmission processor 206 to a resource (e.g., RU), based on the information on the resource assignment of the uplink data input from controller 204, and outputs the mapped signal to radio transceiver 202.

[RU Assignment Method]

Figure 12:
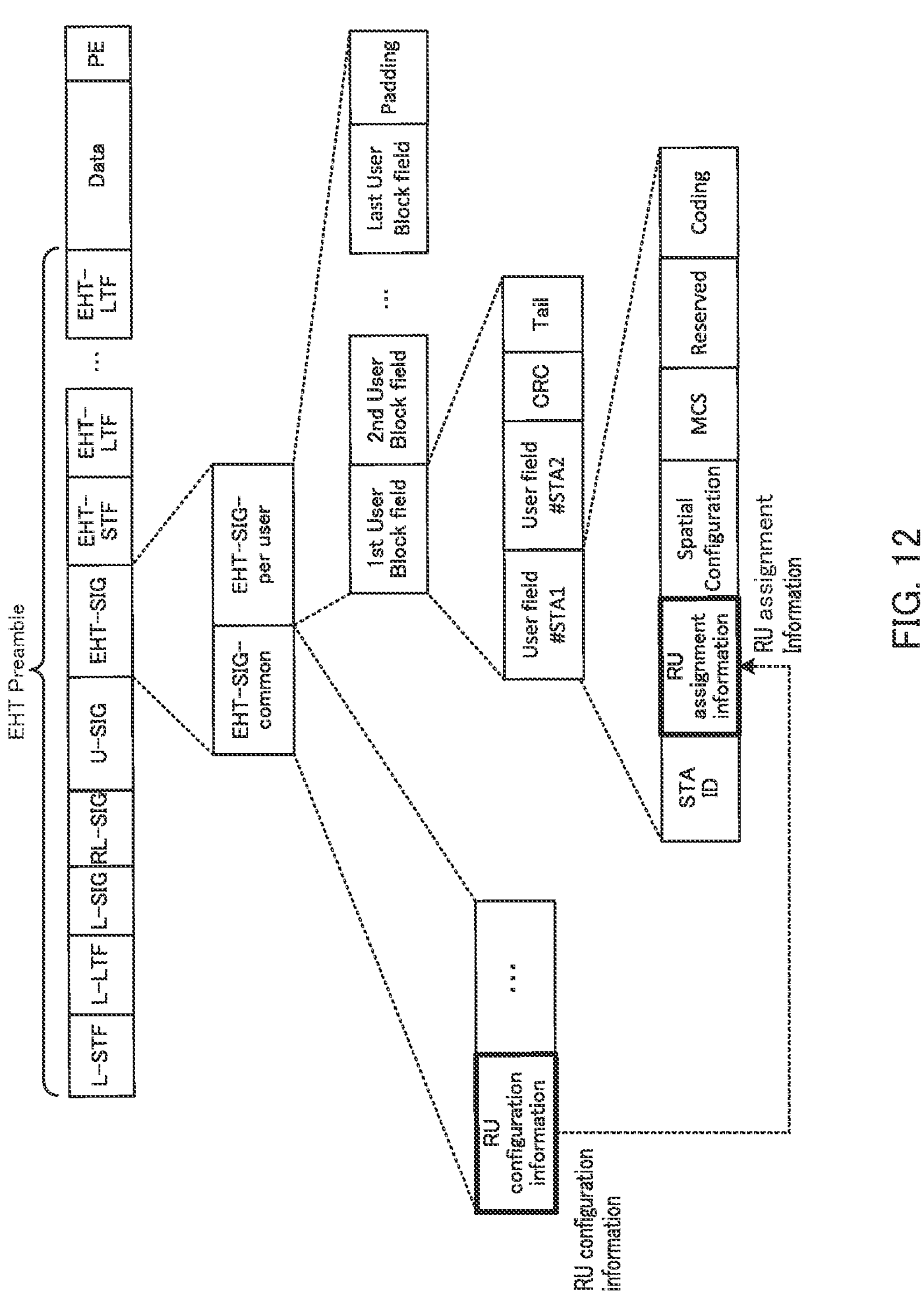
FIG. 12 illustrates an exemplary signaling format for DL OFDMA.

FIG. 12 illustrates an exemplary signaling format for DL according to the present embodiment. By way of example, the signaling format illustrated in FIG. 12 indicates an example based on the signaling format in IEEE 802 11be, but it is not limited to this example.

The EHT-SIG field illustrated in FIG. 12 of a preamble (e.g., EHT preamble) may include, for example, a field (e.g., EHT-SIG-common field) including information shared by a plurality of STAs 200 and a field (e.g., EHT-SIG-per user field) including the user-specific information that is specific to each of the STAs.

Further, the EHT-SIG-common field (i.e., user common field) illustrated in FIG. 12 may include, for example, a field (e.g., RU configuration information subfield) including the information on the configuration of RU (e.g., RU configuration information). The RU configuration information may include, for example, the information on a size of RU and a position of RU in the frequency domain. That is, the RU configuration information may include, for example, information on a candidate for RU (i.e., resource assignment candidate) that can be assigned to STA 200.

Further, the EHT-SIG-per user field illustrated in FIG. 12 may include, for example, one or more User Block fields. Each of the User Block fields may include, for example, User field(s) corresponding to one or two STAs 200 (in FIG. 12, for example, User field #STA 1 corresponding to STA1 and User field #STA 2 corresponding to STA 2). Each of the User fields (i.e., user-specific field) may include, for example, a field (e.g., RU assignment information subfield) including information on RU to be assigned to corresponding STA 200 (hereinafter referred to as RU assignment information). The RU assignment information may include, for example, information on RU assigned to STA 200 among the RU candidates indicated by the RU configuration information.

Hereinafter, a description will be given of exemplary methods for allocating RU based on the RU configuration information and the RU assignment information.

[Method 1]

In Method 1, AP 100 may indicate information on RU to be assigned to STA 200 in bitmap format by, for example, RU assignment information included in a User field. That is, the RU assignment information includes, for example, bitmap information indicating the presence or absence of assignment to STA 200 (e.g., user) in a plurality of RU candidates (e.g., resource assignment candidates) indicated by the RU configuration information.

For example, the RU assignment information may be composed of bits respectively corresponding to each RU in the plurality of RU candidates indicated in the RU configuration information notified in the Common field (e.g., EHT-SIG-common field). Further, a value (e.g., 0 or 1) of one of the bits corresponding to the RU in the candidates may be determined based on whether the RU is assigned to STA 200. For example, bit=0 may indicate that the RU corresponding to the bit is not assigned to STA 200, and bit=1 may indicate that the RU corresponding to the bit is assigned to STA 200. The relation between a bit value and the presence or absence of RU assignment may be reversed.

Figure 13:
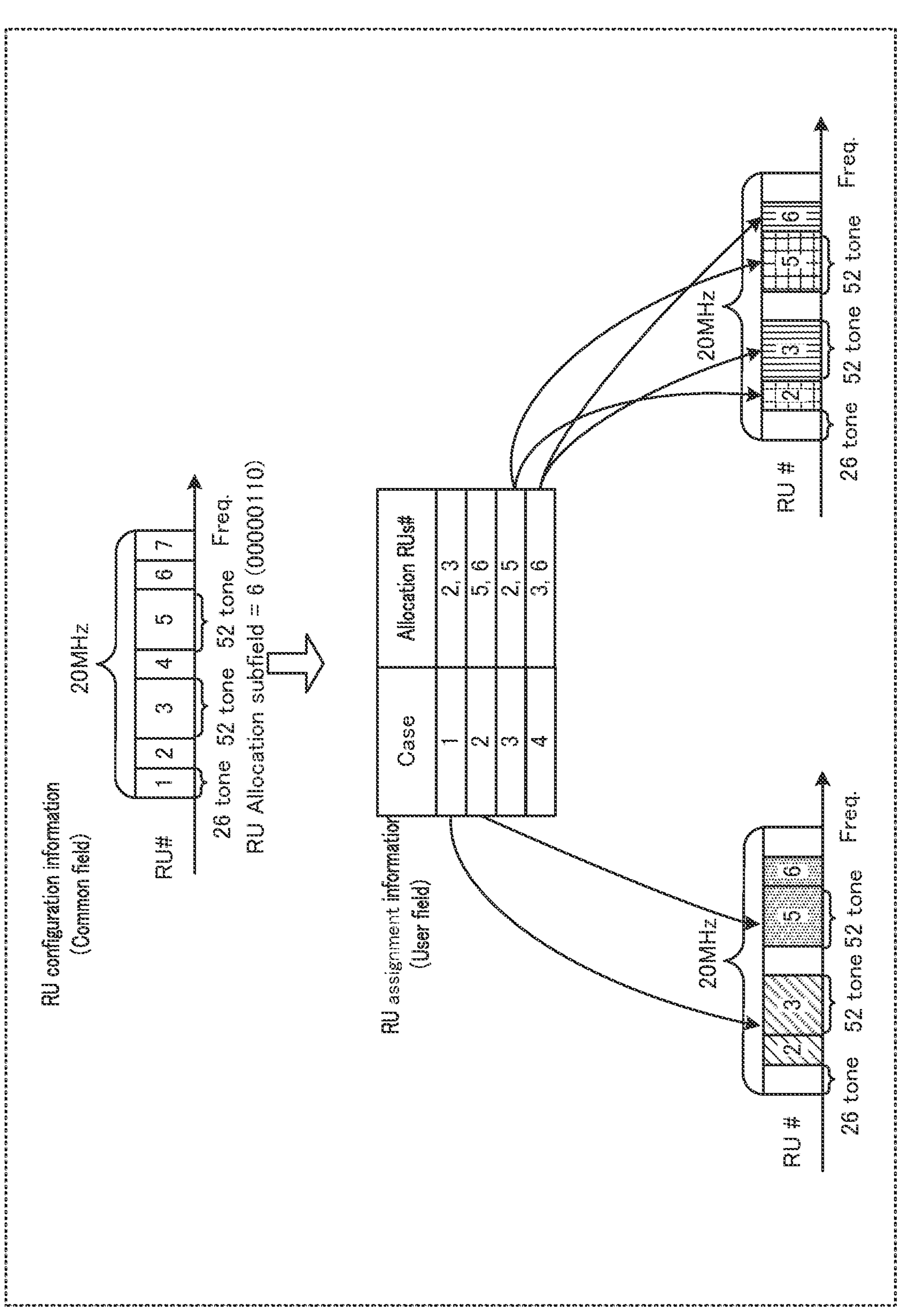
FIG. 13 illustrates an RU assignment example according to Method 1.

FIG. 13 illustrates exemplary RU configuration information, RU assignment information, and RU assignment results according to Method 1.

In FIG. 13, as an example, the RU configuration information may assume a definition of an RU Allocation subfield for DL in IEEE 802 11ax. The RU configuration information illustrated in FIG. 13 corresponds to, for example, RU Allocation subfield=6 (binary digits: 00000110) for DL in IEEE 802 11ax. That is, in the example of FIG. 13, the RU configuration indicated by the RU configuration information has a pattern in which, in a 20 MHz bandwidth, frequency mappings of RUs #1, 2, 4, 6, and 7 are each composed of 26 tones whereas frequency mappings of RUs #3 and 5 are each composed of 52 tones.

Note that, the RU configuration illustrated in the RU configuration information is not limited to the example illustrated in FIG. 13 and may be, for example, an RU configuration corresponding to another value different from RU Allocation subfield=6 for DL in IEEE 802 11ax or another RU configuration different from the RU configuration in DL in IEEE 802 11ax.

Further, in the RU Allocation subfield for DL in IEEE 802 11ax, RU is numbered in units of 26 tones (e.g., in FIG. 2, RU #1 to RU #9), but in this case, one RU number may be assigned to 52-tone RU. In one example, in FIG. 13, for 52-tone RUs, RU #3 and RU #5 are assigned, respectively. For this reason, in the example illustrated in FIG. 13, the range of RU numbers that can be assigned in a 20 MHz bandwidth is RU #1 to #7. Incidentally, the range of RU numbers (i.e., number of RU candidates) may differ by the RU configuration information (e.g., value of RU Allocation subfield (6 in FIG. 13)).

Further, the RU assignment information illustrated in FIG. 13 may include, for example, information indicating the RU number to be assigned to STA 200 among RUs #1 to #7 indicated by the RU configuration information (e.g., information in bit map format). For example, as illustrated in FIG. 13, in a case where RU #[2, 3] (e.g., bitmap: 0110000) as in Case 1 is designated for a certain STA 200 by the RU assignment information, frequency resources of RU #2 and RU #3 may be assigned to the STA 200. Similarly, in a case where RU #[5,6] (e.g., bitmap: 0000110), RU #[2,5] (e.g., bitmap: 0100100), or RU #[3,6] (e.g., bitmap: 0010010) as in Cases 2 to 3 is designated for STAs 200 by the RU assignment information, it is indicated that each STA is assigned to the designated frequency mapping of RU.

Thus, according to Method 1, AP 100 indicates, to STA 200, the assignment RU number in bitmap format by using the RU assignment information in the User field. The RU assignment in bitmap format can improve the flexibility of RU assignment, for example. By way of example, as illustrated in FIG. 13, the RU assignment information included in one User field allows one or more RUs to be assigned to one STA 200. Further, this RU assignment information enables configuration of RU assignment in the contiguous frequency allocation as in Cases 1 and 2 illustrated in FIG. 13 and configuration of RU assignment in the non-contiguous frequency allocation as in Cases 3 and 4.

Further, according to Method 1, it is possible to suppress an increase in the signaling amount in the RU assignment, thereby improving throughput. For example, in the example illustrated in FIG. 13, the number of signaling bits of the RU assignment information included in a User field is seven bits (e.g., bits respectively corresponding to RU #1 to RU #7). Thus, an increase in the number of signaling bits of the RU assignment information according to Method 1 is 24 bits fewer than the increase in the number of signaling bits (e.g., increase by 31 bits) in the above-mentioned method (e.g., FIG. 6).

[Method 2]

In Method 2, for example, a combination of RUs that can be allocated to one STA 200 may be configured (e.g., limited) among all combinations of RUs. Further, AP 100 may indicate, for example, among the combinations of RUs, information on a combination of RUs to be assigned to STA 200, by the RU assignment information included in a User field. That is, the RU assignment information includes, for example, information on any one of a plurality of combinations of RU candidates (e.g., resource assignment candidates) indicated by the RU configuration information.

For example, the RU assignment information may include information for identifying a combination of RUs to be assigned to STA 200 (e.g., RU combination number) and information indicating mapping of RU (e.g., either contiguous allocation and non-contiguous allocation) in the frequency domain that is corresponding to the combination of RUs assigned to STA 200.

Figure 14:
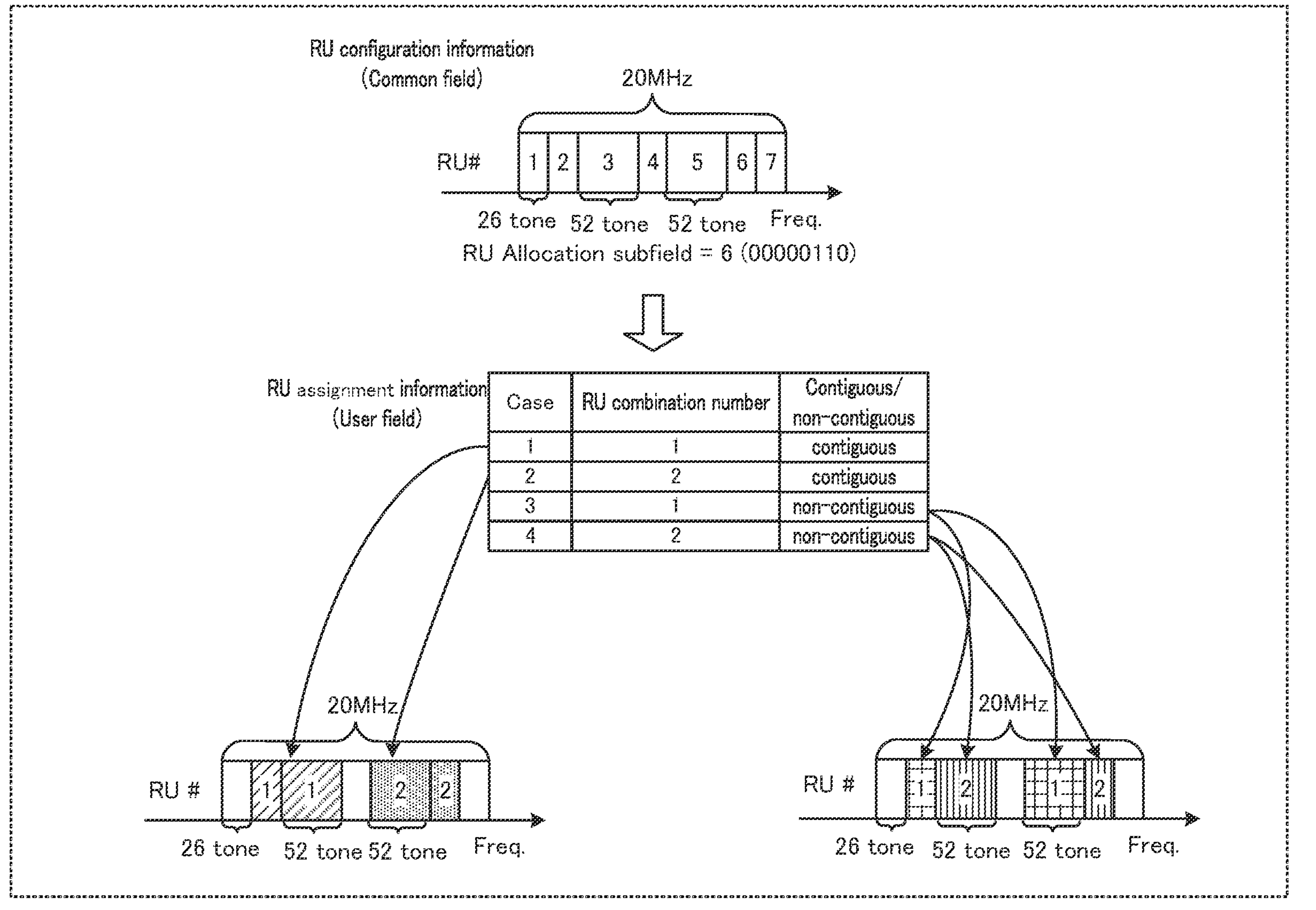
FIG. 14 illustrates an RU assignment example according to Method 2.

FIG. 14 illustrates exemplary RU configuration information, RU assignment information, and RU assignment results according to Method 2.

In FIG. 14, as an example, the RU configuration information may assume a definition of an RU Allocation subfield for DL in IEEE 802 11ax, as in Method 1 (FIG. 13). The RU configuration information illustrated in FIG. 14 corresponds to, for example, RU Allocation subfield=6 (binary digits: 00000110) for DL in IEEE 802 11ax. That is, in the example of FIG. 14, the RU configuration indicated by the RU configuration information has a pattern in which, in a 20 MHz bandwidth, frequency mappings of RUs #1, 2, 4, 6, and 7 are each composed of 26 tones whereas frequency mappings of RUs #3 and 5 are each composed of 52 tones.

Note that, the RU configuration illustrated in the RU configuration information is not limited to the example illustrated in FIG. 14 and may be, for example, an RU configuration corresponding to another value different from RU Allocation subfield=6 for DL in IEEE 802 11ax or another RU configuration different from the RU configuration in DL in IEEE 802 11ax.

Further, the RU assignment information illustrated in FIG. 14 may include, for example, information on the RU combination number and on a frequency mapping method (contiguous or non-contiguous). In one example, in FIG. 14, regarding the RU combination, four combinations (e.g., Cases 1 to 4) are configured in which two kinds of contiguous allocation of and two kinds of non-contiguous allocation are included. For example, the RU assignment information enables configuration of RU assignment in the contiguous frequency allocation as in Cases 1 and 2 illustrated in FIG. 14 and configuration of RU assignment in the non-contiguous frequency allocation as in Cases 3 and 4.

An association between the RU combination numbers #1 and #2 indicated by the RU assignment information and the RU number (RUs #1 to #7 in FIG. 14) in the RU configuration indicated by the RU configuration information may be indicated from AP 100 to STA 200 or may be specified by standards, for example.

Thus, according to Method 2, among all combinations of RUs, a combination of RUs that can be assigned to one STA 200 is configured. AP 100 then indicates, for example, by the RU assignment information in a User field, the RU combination number and the frequency mapping to be assigned to STA 200. With this RU assignment, for example, an increase in the signaling amount in the RU assignment can be suppressed, and throughput can be thus improved. For example, in the example illustrated in FIG. 14, the number of signaling bits of the RU assignment information included in the User field is two bits (e.g., four ways of Cases 1 to 4). Thus, an increase in the number of signaling bits of the RU assignment information according to Method 2 is 29 bits fewer than an increase in the number of signaling bits (e.g., increase by 31 bits) in the above-mentioned method (e.g., FIG. 6).

In FIG. 14, a case has been described where the RU combination number and the frequency mapping (contiguous allocation or non-contiguous allocation) are indicated to STA 200 by the RU assignment information, but it is not limited to this case. For example, some of combinations of RUs indicated by the RU configuration information (e.g., RU #1 to RU #7 in FIG. 14) may be indicated by the RU assignment information. For example, a combination of RUs corresponding to either contiguous allocation and non-contiguous allocation may be included.

Additionally, in FIG. 14, for example, a case has been described where the number of RUs allocated to STA 200 by the RU assignment information is two, but it is not limited to this case. One RU or three or more RUs may be indicated by the RU assignment information. Moreover, for example, the number of RUs associated may be differ depending on the RU combination number.

Furthermore, the combinations of RUs that can be assigned to STA 200 by the RU assignment information are not limited to four ways and may be two, three, or five or more ways.

[Method 3]

In Method 3, for example, AP 100 may indicate, to STA 200, whether a combination of a plurality of RUs is assigned to STA 200 by the RU assignment information included in a User field (i.e., the presence or absence of RU combination). That is, the RU assignment information includes, for example, information indicating whether a combination of a plurality of RU candidates (e.g., resource assignment candidates) indicated by the RU configuration information is used for assignment to STA 200 (e.g., user).

Here, a combination pattern of the plurality of RUs may be classified into, for example, a category of small RU size (Small-size RUs) less than 20 MHz bandwidth {e.g., 26, 52, and 106 tones} and a category of large RU size (Large-size RUs) greater than or equal to 20 MHz bandwidth (e.g., 242, 484, and 996 tones), while the combination of RUs may be configured for a combination of RUs within each category.

In Method 3, as an example, the RU combination is assumed in which the RU size is a large RU size (Large-size RU) greater than or equal to 20 MHz bandwidth (e.g., 242 tones).

Figure 15:
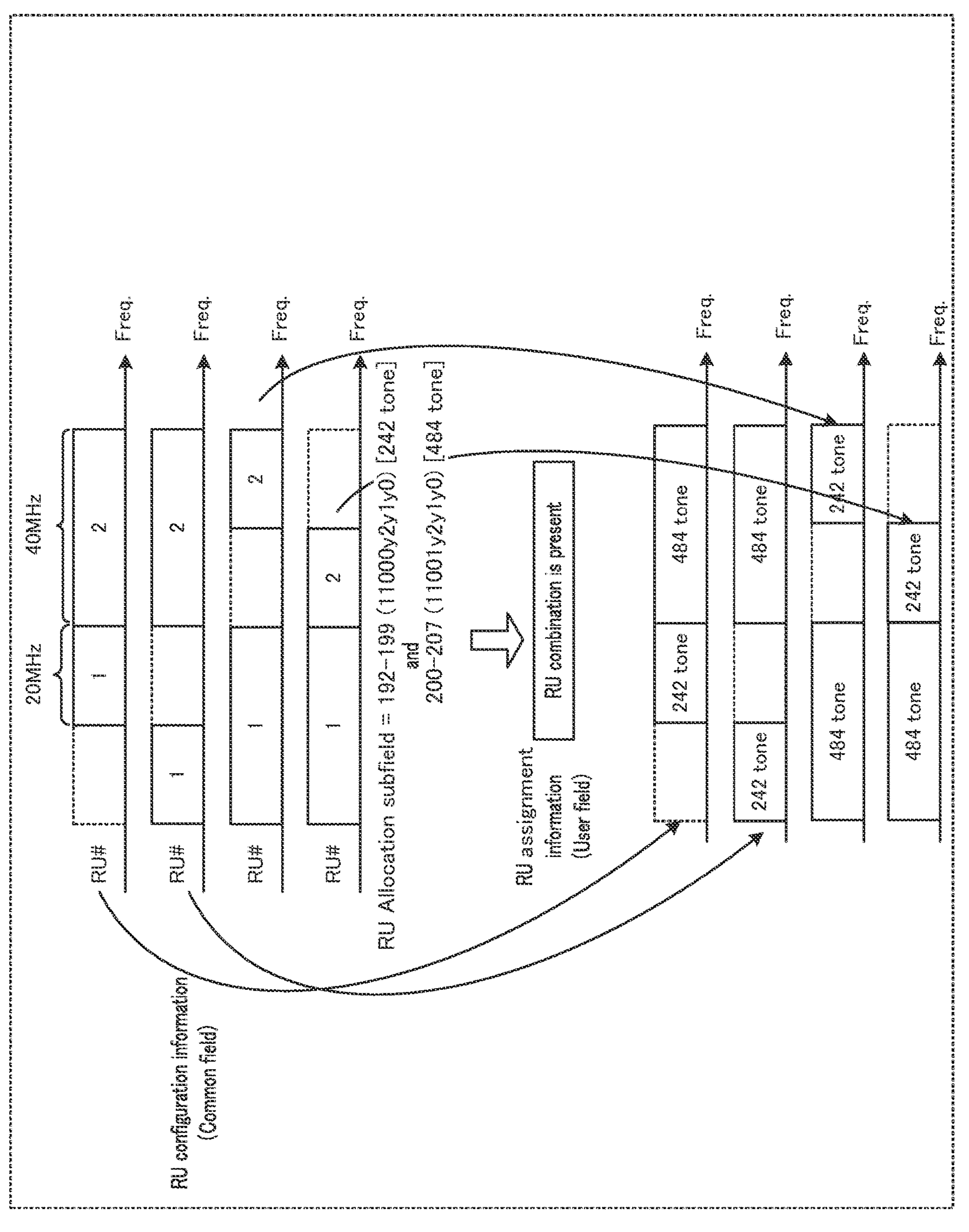
FIG. 15 illustrates an RU assignment example according to Method 3.

FIG. 15 illustrates exemplary RU configuration information, RU assignment information, and RU assignment results according to Method 3.

In FIG. 15, as an example, the RU configuration information may assume a definition of an RU Allocation subfield for DL in IEEE 802 11ax. The RU configuration information illustrated in FIG. 15 corresponds to, for example, RU Allocation subfield=192 to 199 (binary digits: 11000y2y1y0) [242 tones] and RU Allocation subfield=200 to 207 (binary digits: 11001y2y1y0) [484 tones]. That is, in the example of FIG. 15, the RU configuration indicated by the RU configuration information has a pattern in which 242 tones equivalent to a 20 MHz bandwidth and 484 tones equivalent to a 40 MHz bandwidth are defined one each within an 80 MHz bandwidth.

Note that, the configuration of RU illustrated in the RU configuration information is not limited to the example illustrated in FIG. 15 and may be, for example, an RU configuration corresponding to another value different from 192 to 199 and 200 to 207 of the RU Allocation subfield for DL in IEEE 802 11ax or another RU configuration different from the RU configuration in DL in IEEE 802 11ax.

In addition, for example, frequency mappings of two RUs of 242-tone RU and 484-tone RU indicated by the RU configuration information (e.g., RU #1 and RU #2) may be four patterns illustrated in FIG. 15.

Further, the RU assignment information illustrated in FIG. 15 may include, for example, information indicating whether the combination of RU #1 and RU #2 indicated by the RU configuration information is assigned to STA 200 (i.e., the presence or absence of RU combination). For example, in FIG. 15, one kind of RU combination of 242-tone RU and 484-tone RU within an 80 MHz bandwidth is present. Hence, STA 200 can recognize RU allocated to STA 200 (e.g., the presence or absence of RU combination) by the RU assignment information indicating the presence or absence of the RU combination.

For example, as illustrated in FIG. 15, when the RU assignment information indicates that an RU combination is present, STA 200 may determine that the combination of RUs (e.g., RU #1 and RU #2) indicated by the RU configuration information is assigned to STA 200. On the other hand, when the RU assignment information indicates that an RU combination is absent, STA 200 may determine that RUs (e.g., RU #1 and RU #2) indicated by the RU configuration information are allocated to different STAs, respectively.

Thus, according to Method 3, in a case of one kind of RU combination, AP 100 indicates information indicating the presence or absence of the RU combination to be allocated to STA 200 according to the RU assignment information in the User field. With this RU assignment, for example, an increase in the signaling amount in the RU assignment can be suppressed, and throughput can be thus improved. For example, in the example illustrated in FIG. 15, the number of signaling bits of the RU assignment information included in the User field is one bit (e.g., present or absent). Thus, an increase in the number of signaling bits of the RU assignment information according to Method 3 is 30 bits fewer than an increase in the number of signaling bits (e.g., increase by 31 bits) in the above-mentioned method (e.g., FIG. 6).

Incidentally, in FIG. 15, a case has been described where the information on the presence or absence of the RU combination is included in the User field, but the information on the presence or absence of the RU combination may be indicated by the RU configuration information in the Common field. For example, the information on the presence or absence of the RU combination in the Common field or information on OFDMA and non-OFDMA may be added to an RU Allocation subfield as in Method 6 to be described later, or may be added to a different field from the RU Allocation subfield.

Further, in FIG. 15, as an example, a case has been described where the combination pattern of RUs (i.e., kind of RU combination) is one, but the number of combination patterns of RU may be two or more.

Further, the present embodiment has described the combination of RUs in the category of Large-size RU, but the combination of RUs is not limited to this. In one example, the combination of RUs may be a combination of RUs in the category of Small-size RU or a combination of RUs in both categories of Large-size RU and Small-size RU.

[Method 4]

In Method 4, for example, additional control information may be included in a Common field or a User field for switching an assignment method of RU according to the RU assignment information included in the User field. That is, for example, STA 200 may receive information indicating a configuration of the RU assignment information (i.e., allocation type) and perform the communication control according to the configuration of the RU assignment information indicated by the information.

Figure 16:
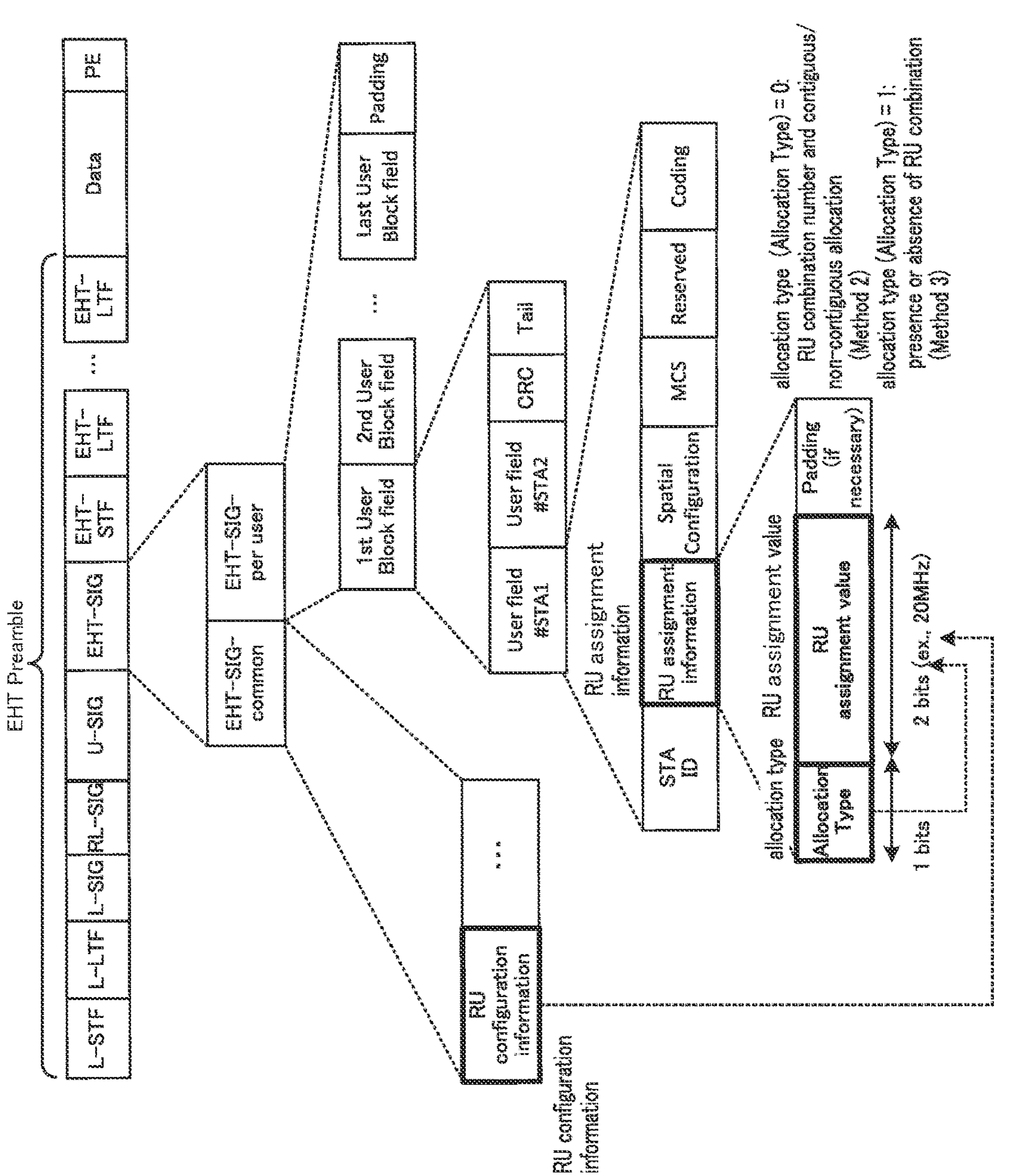
FIG. 16 illustrates an exemplary signaling format according to Method 4.

FIG. 16 illustrates an exemplary signaling format for DL according to Method 4.

As illustrated in FIG. 16, for example, in the RU assignment information field (e.g., RU assignment information subfield) in a User field, an allocation type (Allocation type) for switching an RU assignment method may be provided. STA 200 may switch, based on the Allocation type, a definition of an RU assignment value (RU assignment value), for example.

For example, any of Methods 1 to 3 may be configured as the assignment method of RU. In the example of FIG. 16, Method 2 and Method 3 are switched according to the Allocation type. By way of example, in FIG. 16, when allocation type=0, the RU assignment method according to Method 2 may be configured, and when allocation type=1, the RU assignment method according to Method 3 may be configured.

Further, for example, regardless of the Allocation type (i.e., RU assignment method), when a size of RU assignment information is fixed, the size may be set constant by adding a padding bit as illustrated in FIG. 16. Meanwhile, in the example of FIG. 16, a case has been described where the allocation type is placed in the RU assignment information in the User field, but the allocation type may be included in a field different from the RU assignment information in the User field, the RU configuration information in the Common field, or a field different from the RU configuration information in the Common field.

According to Method 4, for example, switching the RU assignment methods such as Methods 1 to 3 can improve the scheduling flexibility while suppressing an increase in signaling bits.

Incidentally, in Method 4, a case has been described where the allocation type is indicated by being included in the Common field or the User field, but the allocation type may be implicitly indicated to STA 200 based on, for example, other information. For example, STA 200 may determine that Method 2 (or Method 1) is configured in a case where the frequency bandwidth assigned to STA 200 is less than 20 MHz, while STA 200 may determine that Method 3 is configured, and thus switch the RU assignment methods indicated by the RU assignment information in a case where the frequency bandwidth is 20 MHz or more.

[Method 5]

In Method 5, for STA 200, the RU configuration information need not be included in a packet including the RU allocation information, for example.

In one example, the RU configuration information may be indicated to STA 200 prior to an indication of the RU allocation information. For example, AP 100 may transmit a beacon including the RU configuration information to STA 200.

Alternatively, the RU configuration information may be previously configured for STA 200 or be defined (i.e., specified) by specifications (or standards), for example.

Figure 17:
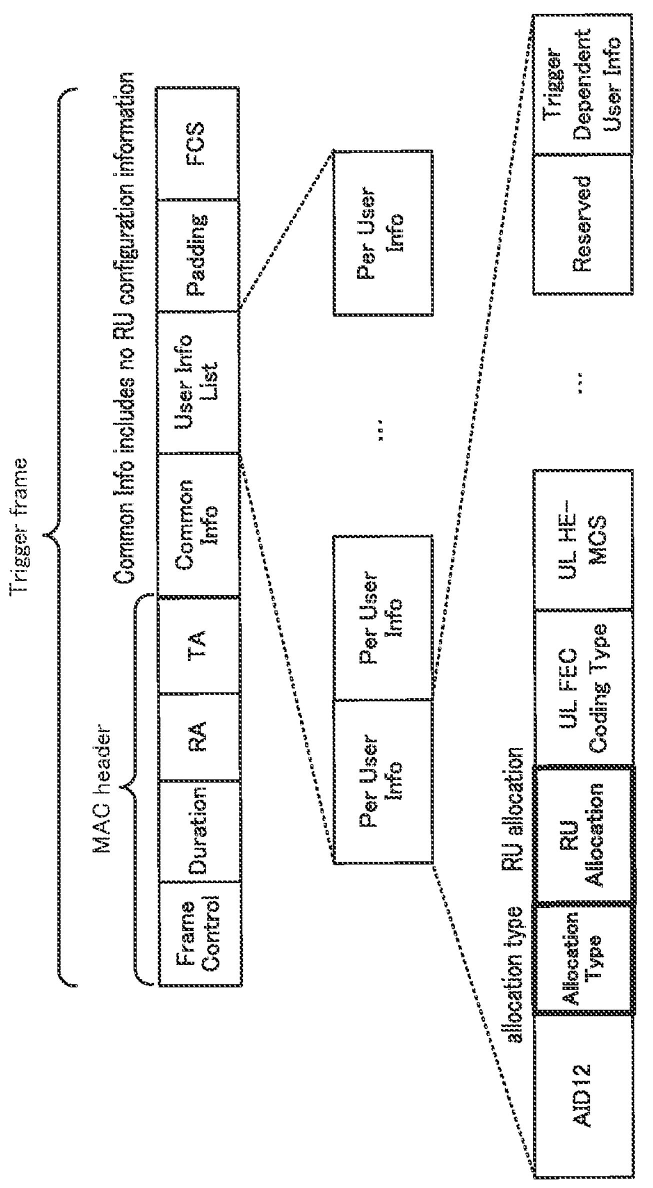
FIG. 17 illustrates an exemplary signaling format according to Method 5.

By way of example, Method 5 may be applied to RU allocation for a Trigger frame in UL OFDMA. FIG. 17 illustrates a configuration example of the Trigger frame in UL OFDMA according to Method 5.

The Common Info field illustrated in FIG. 17 need not include, for example, the RU configuration information. The RU configuration information may be indicated to STA 200 by a beacon or may be defined by specifications as mentioned above.

In addition, as illustrated in FIG. 17, a Per User Info field may include, for example, RU allocation information corresponding to any of Methods 1 to 4 described above. In FIG. 17, as an example, the Per User Info field may include information on an allocation type (e.g., Allocation Type subfield) and RU allocation information (e.g., RU Allocation subfield) corresponding to the allocation type. In FIG. 17, as an example, the RU allocation information according to Method 4 (e.g., including allocation type and RU allocation value) has been described, but the RU allocation method is not limited to Method 4 and may be any of Method 1 to Method 3 or Method 6 to Method 8 to be described later. In the case of Method 1 to Method 3, for example, the allocation type illustrated in FIG. 17 may not be included.

For example, STA 200 may identify RU to be allocated to STA 200 based on the holding RU configuration information and the allocation information indicated in the Trigger frame. That is, even in UL, as in DL in Method 1 to Method 4 described above or Method 6 to Method 8, the allocation of a plurality of RUs such as contiguous allocation or non-contiguous allocation is possible by the RU allocation information indicated in one Per User Info field (e.g., user specific information) corresponding to STA 200.

Thus, according to Method 5, for example, even in the Trigger frame in UL OFDMA, it is possible to suppress an increase in the signaling amount related to the RU allocation, thereby improving throughput.

[Method 6]

In Method 6, AP 100, for example, may indicate RU configuration information indicating the RU configuration (e.g., RU candidate or resource assignment candidate) and a combination of the RU candidates (e.g., list of RU combinations) in a Common field and may indicate information (e.g., RU combination number) for identifying the combination to be assigned to STA 200 by using RU assignment information included in a User field.

Figure 18:
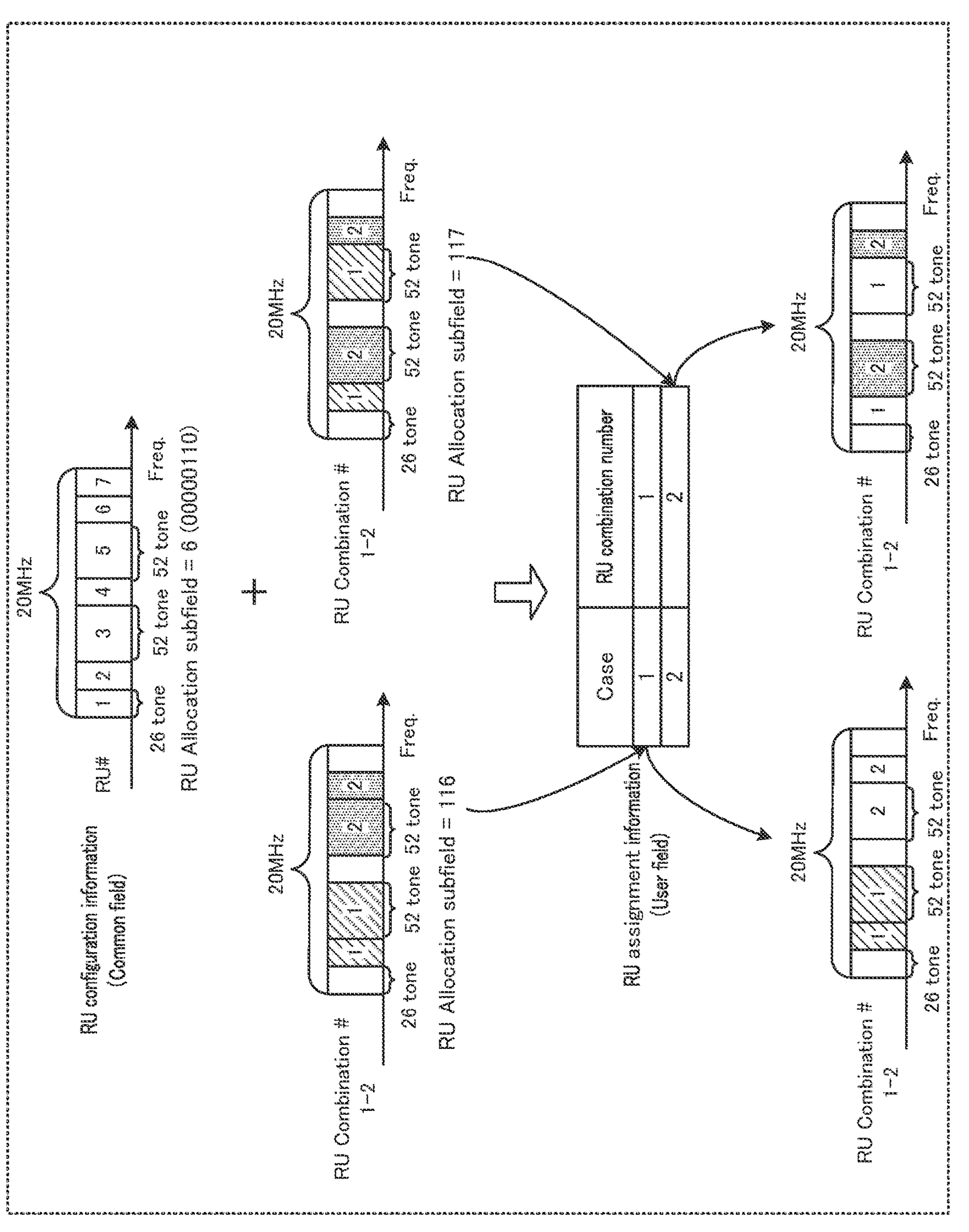
FIG. 18 illustrates an RU assignment example according to Method 6.

FIG. 18 illustrates exemplary RU configuration information, RU assignment information, and RU assignment results according to Method 6.

In FIG. 18, as an example, the RU configuration information may assume a definition of an RU Allocation subfield for DL in IEEE 802 11ax. The RU configuration information illustrated in FIG. 18 corresponds to, for example, RU Allocation subfield=6 (binary digits: 00000110) for DL in IEEE 802 11ax.

Further, the RU configuration information illustrated in FIG. 18 may include, for example, RU combination information on a combination of a plurality of RU candidates. The RU combination information may be defined in, for example, an undefined region of the RU Allocation subfield for DL in IEEE 802 11ax.

FIG. 19 illustrates an example of RU configuration information according to Method 6. In FIG. 19, the RU configuration information assumes, for example, a definition of an RU Allocation subfield, and the RU Allocation subfield may be included, as the RU configuration information, in an EHT-SIG-common field. For example, the RU Allocation subfield for DL in IEEE 802 11ax includes an undefined region (in other words, an undefined entry) of 52 entries (e.g., RU Allocation subfield=116 to 127, and 216 to 255). For example, the RU combination information may be added to the undefined entry. That is, some of values of the RU Allocation subfield indicate, as in the case of IEEE 802 11 ax, an RU configuration not including an assignment of the combination of a plurality of RUs, and a particular value, which is different from the value indicating the RU configuration not including the assignment of the combination of the plurality of RUs, indicates a particular RU configuration including the assignment of the combination of the plurality of RUs.

In the example illustrated in FIG. 19, RU combination information indicating RU combinations according to Methods 1 to 3 may be included. For example, in FIG. 19, the RU combination information indicating combinations of 26-tone RUs and 52-tone RUs, which have a small RU size less than a 20 MHz bandwidth (Small-size RUs), may be defined in RU Allocation subfields=116 and 117. On the other hand, for example, in FIG. 19, the RU combination information indicating combinations of 242-tone RUs and 484-tone RUs, which have a large RU size greater than or equal to a 20 MHz bandwidth (Large-size RUs), may be defined in RU Allocation subfields=216 and 217.

Incidentally, in FIG. 19, "-A" and "-B" indicate that they form a pair of the same combination. For example, "-A" illustrated in FIG. 19 may correspond to the combination of RU combination number=1 illustrated in FIG. 18, and "-B" illustrated in FIG. 19 may correspond to the combination of RU combination number=2 illustrated in FIG. 18.

Note that, the RU combination is not limited to the example illustrated in FIG. 19 and may include, for example, some or all of the RU combinations specified by the specifications of IEEE 802 11be. Further, an RU Allocation subfield pattern may include unallocation information.

For example, the RU configuration information illustrated in FIG. 18 may include the RU configuration corresponding to RU Allocation subfield=6 and the RU combination corresponding to RU Allocation subfield=116 or 117.

Further, the RU assignment information illustrated in FIG. 18 may include, for example, information indicating an RU combination number to be assigned to each STA 200 among the RU combinations in RU #1 to RU #7 indicated by the RU configuration information.

For example, in FIG. 18, when RU Allocation subfield=116 of the RU combination having the contiguous frequency mapping (e.g., FIG. 19) is designated by the RU configuration information and RU combination number=1 is indicated by the RU assignment information, STA 200 may determine that RUs corresponding to RU combination number 1 with the contiguous RU mapping (e.g., RU #2 and RU #3) are the assigned RUs. Similarly, when RU Allocation subfield=116 (e.g., FIG. 19) is designated by the RU configuration information and RU combination number=2 is indicated by the RU assignment information, STA 200 may determine that RUs corresponding to RU combination number 2 with the contiguous RU mapping (e.g., RU #5 and RU #6) are the assigned RUs (not illustrated).

Moreover, for example, in FIG. 18, when RU Allocation subfield=117 of the RU combination with the non-contiguous frequency mapping (e.g., FIG. 19) is designated by the RU configuration information and RU combination number=2 is indicated by the RU assignment information, STA 200 may determine that RUs corresponding to RU combination number 2 with the non-contiguous RU mapping (e.g., RU #3 and RU #6) are the assigned RUs. Similarly, when RU Allocation subfield=117 (e.g., FIG. 19) is designated by the RU configuration information and RU combination number=1 is indicated by the RU assignment information, STA 200 may determine that RUs corresponding to RU combination number 1 with the non-contiguous RU mapping (e.g., RU #2 and RU #5) are the assigned RUs (not illustrated).

Thus, according to Method 6, including the RU combination information (i.e., list of RU combinations) in the Common field makes it possible to suppress an increase in the signaling amount related to the RU assignment in the User field, thereby improving throughput. For example, in the example illustrated in FIG. 18, the number of signaling bits of the RU assignment information in the User field is one bit. Thus, an increase in the number of signaling bits of the RU assignment information according to Method 6 is 30 bits fewer than an increase in the number of signaling bits (e.g., increase by 31 bits) in the above-mentioned method (e.g., FIG. 6).

Incidentally, in FIGS. 18 and 19, a combination of one or two RUs has been described, but the number of RUs included in an RU combination may be three or more.

[Method 7]

In method 7, AP 100, for example, may indicate information on RU assignment for a plurality of STAs 200 (i.e., a plurality of users) in RU assignment information included in each of User fields respectively corresponding to STAs 200.

In other words, RU assignment information for a certain STA 200 may be configured in each of the User field (i.e., user-specific field) that is directed to and received by the certain STA 200 and a User field that is directed to another STA.

Figure 20:
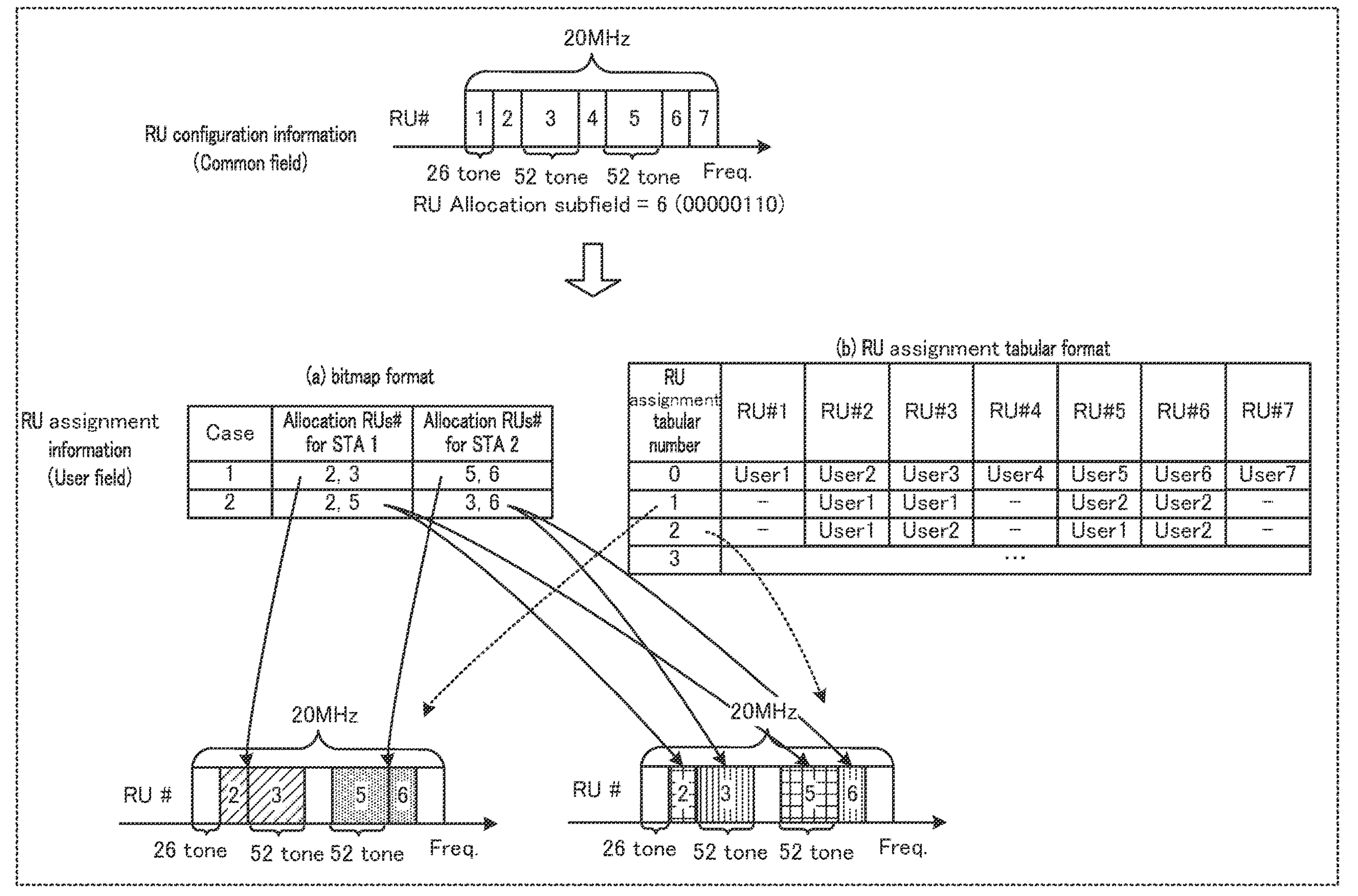
FIG. 20 illustrates an RU assignment example according to Method 7.

FIG. 20 illustrates exemplary RU configuration information, RU assignment information, and RU assignment results according to Method 7.

In FIG. 20, as an example, the RU configuration information may assume a definition of an RU Allocation subfield for DL in IEEE 802 11ax, as in Embodiment 1. The RU configuration information illustrated in FIG. 20 corresponds to, for example, RU Allocation subfield=6 (binary digits: 00000110) for DL in IEEE 802 11ax. That is, in the example of FIG. 20, the RU configuration indicated by the RU configuration information has a pattern in which, in a 20 MHz bandwidth, frequency mappings of RUs #1, 2, 4, 6, and 7 are each composed of 26 tones whereas frequency mappings of RUs #3 and 5 are each composed of 52 tones.

Note that, the RU configuration illustrated in the RU configuration information is not limited to the example illustrated in FIG. 20 and may be, for example, an RU configuration corresponding to another value different from RU Allocation subfield=6 for DL in IEEE 802 11ax or another RU configuration different from the RU configuration in DL in IEEE 802 11ax.

Further, the RU assignment information illustrated in FIG. 20 may include, for example, information on RU (e.g., RU number) to be allocated to each of the plurality of STAs 200, among RUs 31 to 37 indicated by the RU configuration information.

For example, as illustrated in FIG. 20, examples of methods for indicating the RU assignment information include (a) bitmap format and (b) RU assignment tabular format.

In (a) bitmap format, the RU assignment information may include, for example, information indicating RU numbers (in other words, assigned RUs) to be assigned to each of the plurality of STAs 200, among RUs indicated by the RU configuration information.

For example, bit strings (e.g., seven bits) corresponding to seven RUs #1 to #7 indicated by the RU configuration information may be included for the plurality of STAs 200. In the example of the bitmap format illustrated in FIG. 20, the RU assignment information may composed of 14 bits (seven bits×two users) indicating whether each of RUs #1 to #7 is allocated to STA 1 and STA 2.

In one example, in Case 1 illustrated in FIG. 20, the assigned RU numbers for STA 1 are 2 and 3 (bits corresponding to RU #2 and #3 are ON; for example, bit map: 0110000) whereas the assigned RU numbers for STA 2 are 5 and 6 (bits corresponding to RU #5 and #6 are ON; for example, bit map: 0000110). This allows each STA 200 to identify that, for example, the pair of RU numbers 2 and 3 contiguous in the frequency domain are the assigned RUs for STA 1 and the pair of RU numbers 5 and 6 contiguous in the frequency domain are the assigned RUs for STA 2.

Further, for example, in Case 2 illustrated in FIG. 20, the assigned RU numbers for STA 1 are 2 and 5 (bits corresponding to RU #2 and #5 are ON; for example, bit map: 0100100) whereas allocated RU numbers for STA 2 are 3 and 6 (bits corresponding to RU #3 and #6 are ON; for example, bit map: 0010010). This allows each STA 200 to identify that, for example, the pair of RU numbers 2 and 5 contiguous in the frequency domain are the assigned RUs for STA 1 and the pair of RU numbers 3 and 6 contiguous in the frequency domain are the assigned RUs for STA 2.

Further, in (b) RU assignment tabular format, for example, an assignment pattern (or also referred to as assignment state) of each STA 200 (i.e., each user) for RUs (e.g., RU #1 to #7) as illustrated in FIG. 20 may be defined. The association between RUs and users may be indicated in a table, for example. The RU assignment information may include, for example, a number for identifying the association between RU and a user (e.g., referred to as RU assignment tabular number).

In the example of FIG. 20, in the RU assignment corresponding to RU assignment tabular number=1, an assigned RU number for user 1 (e.g., STA 1) is a pair of 2 and 3, and an assigned RU number for user 2 (e.g., STA 2) is a pair of 5 and 6. This allows each of STAs 200 to identify that, for example, the pair of RU numbers 2 and 3 contiguous in the frequency domain are the assigned RUs for STA 1 and the pair of RU numbers 5 and 6 contiguous in the frequency domain are the assigned RUs for STA 2.

Moreover, in the example of FIG. 20, in the RU assignment corresponding to RU assignment tabular number=2, an assigned RU number for user 1 (e.g., STA 1) is a pair of 2 and 5, and an assigned RU number for user 2 (e.g., STA 2) is a pair of 3 and 6. This allows each of STAs 200 to identify that, for example, the pair of RU numbers 2 and 5 non-contiguous in the frequency domain are the assigned RUs for STA 1 and the pair of RU numbers 3 and 6 non-contiguous in the frequency domain are the assigned RUs for STA 2.

Thus, according to Method 7, STA 200 can identify the RU assignment for a plurality of STAs 200 by, for example, reading RU assignment information included in any of User fields corresponding to the plurality of STAs 200.

Additionally, Method 7 makes it possible to suppress an increase in the signaling amount related to the RU assignment, thereby improving throughput.

For example, in the exemplary bitmap format illustrated in FIG. 20, the number of signaling bits in the RU assignment information (e.g., RU assignment for two STAs) included in a User fields is 14 bits. Thus, an increase in the number of signaling bits of the RU assignment information according to the bitmap format of Method 7 is 17 bits fewer than an increase in the number of signaling bits (e.g., increase by 31 bits) in the above-mentioned method (e.g., FIG. 6).

Further, for example, in the exemplary RU assignment tabular format illustrated in FIG. 20, the number of signaling bits of the RU assignment information (e.g., four patterns of RU assignment states) included in a User field is two bits. Thus, an increase in the number of signaling bits of the RU assignment information according to the RU assignment tabular format of Method 7 is 29 bits fewer than an increase in the number of signaling bits (e.g., increase by 31 bits) in the above-mentioned method (e.g., FIG. 6).

Further, for example, in DL in IEEE 802 11ax, the number of User fields included in a User Specific field is equal to the number of RUs indicated by RU Allocation, and the order of User fields corresponding to STAs indicates the positions of RUs allocated to STAs. Thus, in DL in IEEE 802 11ax, the RU assignment for STAs is identified based on the order of User fields included in the User Specific field; thus, for example, each of the STAs has a possibility of failing to identify the RU assignment for subject-STA or other STAs in a case where decoding of a certain User field is incorrectly performed. In other words, each of the STAs has a possibility of failing to identify RU based on the information on one User field (e.g., a User field corresponding to each STA).

On the other hand, according to Method 7, even when failing to decode a certain User field, STAs 200 can identify RU assignment for each of the plurality of STAs 200 as long as decoding of other User fields is successfully performed. In other words, according to Method 7. STAs 200 can identify the assigned RUs for STAs 200 without depending on the order of User fields included in a User Specific field.

Incidentally, the RU assignment information in bitmap format and the association between RUs and STAs (or Users) in the RU assignment information in RU assignment tabular format illustrated in FIG. 20 are exemplary and are not limited to these examples. For example, in the RU assignment information in bitmap format or in RU assignment tabular format, an STA to which contiguous RUs are allocated and an STA to which non-contiguous RUs are allocated may coexist. Moreover, the number of RUs allocated to each STA may vary in RU assignment information in bitmap format or in RU assignment information in RU assignment tabular format. Furthermore, in the RU assignment information in RU assignment tabular format, all combinations of RU assignments that can be taken for a plurality of STAs (i.e., association of RUs and STAs) may be defined, or some of all combinations of RU assignments may be defined.

[Method 8]

In Method 8, AP 100, for example, may indicate a start position of RU allocated to STA 200 (e.g., may be also referred to as starting RU) and an end position of RU (e.g., may be also referred to as ending RU), according to RU assignment information included in a User field. Further, in the RU assignment information, a length of RU allocated to STA 200 (e.g., may be also referred to as RU length) may be included, instead of the ending RU.

STA 200, for example, may convert an RU number indicated by the RU assignment information, in accordance with a prescribed rule.

Hereinafter, as an example, Determination methods 1 to 3 for RU will be described.

In the following examples, the RU configuration information may assume a definition of an RU Allocation subfield for DL in IEEE 802 11ax. Hereinafter, as an example, a case will be described where the RU configuration information corresponds to, for example, RU Allocation subfield=0 (binary digits: 00000000) for DL in IEEE 802 11ax. In other words, in the following examples, an RU configuration indicated by the RU configuration information has a pattern in which RUs #1 to #9 are composed of 26 tones in a 20 MHz bandwidth.

The RU configuration indicated by the RU configuration information may be an RU configuration corresponding to another value different from RU Allocation subfield=0 for DL in IEEE 802 11 ax or another RU configuration different from the RU configuration in DL in IEEE 802 11ax.

<Determination Method 1>

Figure 21:
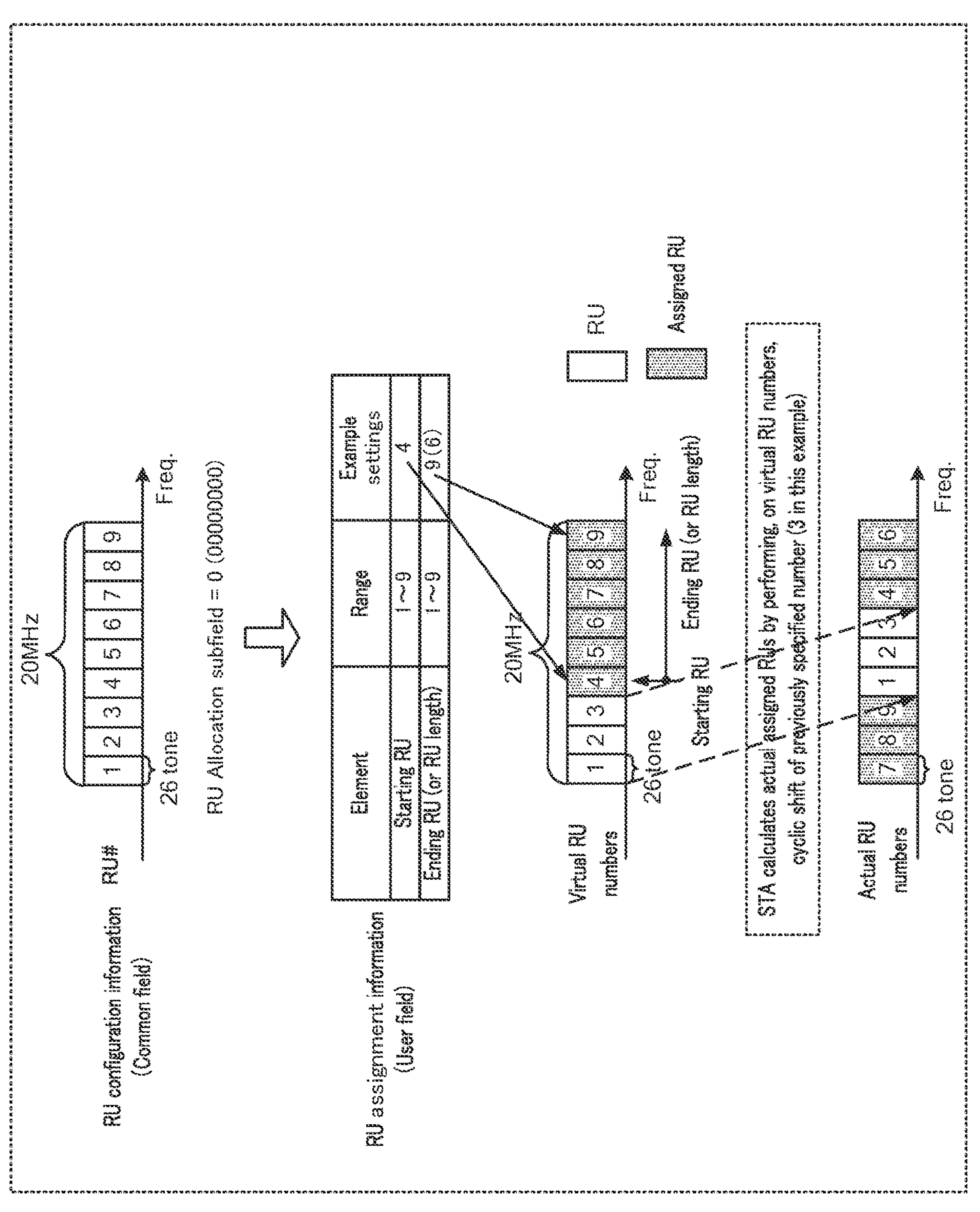
FIG. 21 illustrates an RU assignment example according to Method 8.

FIG. 21 illustrates exemplary RU configuration information, RU assignment information, and RU assignment results according to Determination Method 1.

The RU assignment information illustrated in FIG. 21 may include, for example, information on a starting RU (e.g., starting RU number) and information on ending RU (e.g., end RU number) or on the RU length of RU allocated to STA 200.

In FIG. 21, the range of the starting RU and the ending RU (or RU length) that can be indicated by the RU assignment information may be configured to, for example, a range of RUs (e.g., 1 to 9) indicated by the RU configuration information.

STA 200, for example, may perform communication control by using RUs having cyclically shifted RU numbers from the starting RU number to the ending RU number. Alternatively, STA 200, for example, may perform communication control by using RUs having cyclically shifted RU numbers within the range of the RU length from the starting RU number.

As a configuration example in FIG. 21, a case will be described where the starting RU is 4 and the end RU is 9 (6 in the case of RU length). In this case, for example, the range of RU numbers #4 to #9 (e.g., may be also referred to as virtual RU numbers) may be configured in a virtual RU assignment range. STA 200, for example, may calculate actual assigned RU numbers by performing, on the virtual RU numbers, a cyclic shift of a specified number (in other words, cyclic shift amount). In FIG. 21, since the cyclic shift amount is set to 3, three RUs at each of both ends in a 20 MHz bandwidth are allocated to STA 200.

According to Determination Method 1, the cyclic shift of the assigned RUs enables assignment of non-contiguous RUs in the frequency domain, thereby improving the scheduling flexibility.

<Determination Method 2>

In Determination Method 2, a case will be described where a "wrap around" method is applied.

Figure 22:
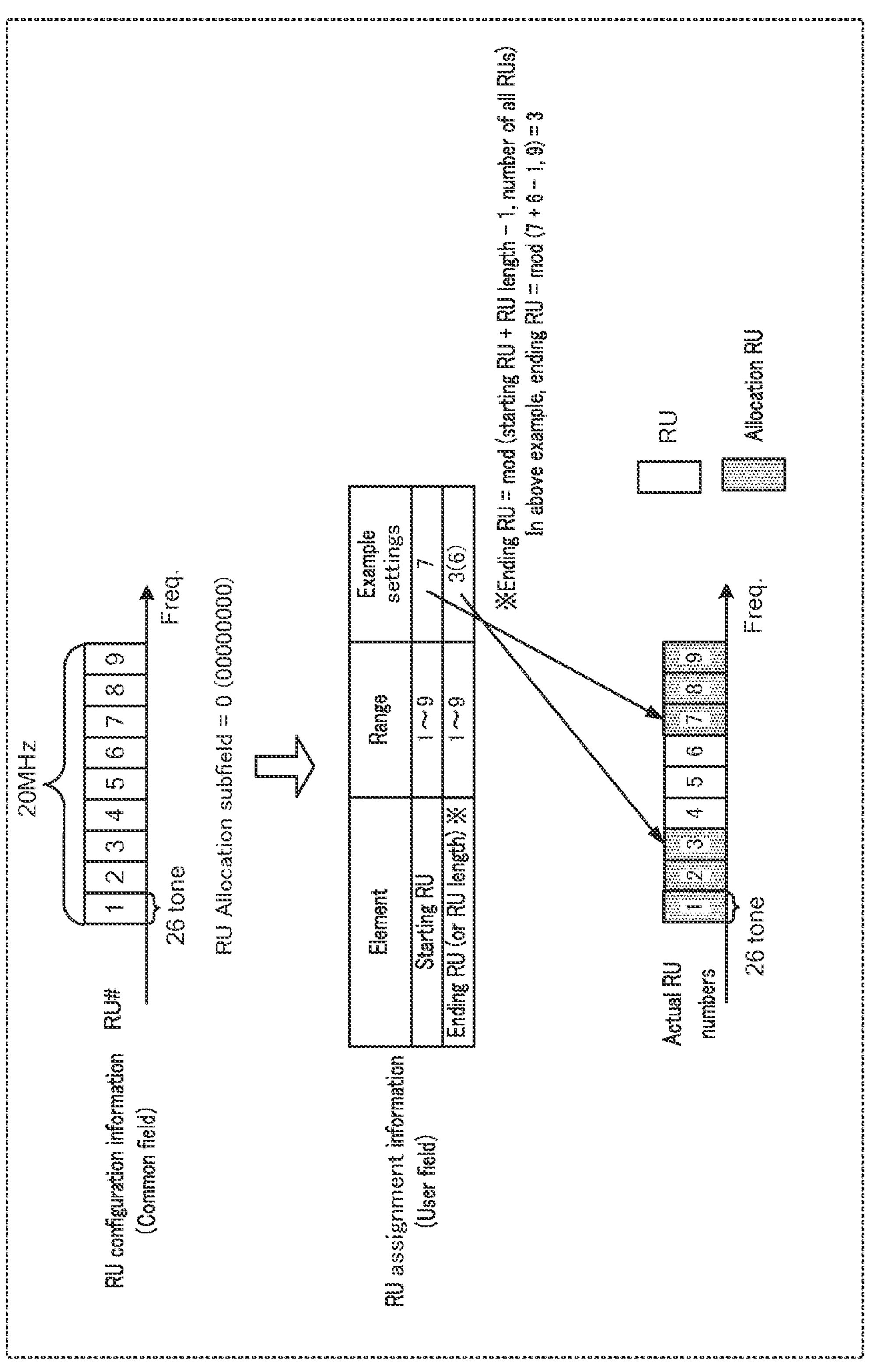
FIG. 22 illustrates another RU assignment example according to Method 8.

FIG. 22 illustrates exemplary RU configuration information, RU assignment information, and RU assignment results according to Determination Method 2.

The RU assignment information illustrated in FIG. 22 may include, for example, information on a starting RU (e.g., starting RU number) and information on ending RU (e.g., end RU number) or on the RU length of RU allocated to STA 200.

In FIG. 22, the range of the starting RU and the ending RU (or RU length) that can be indicated by the RU assignment information may be configured to, for example, a range of RUs (e.g., 1 to 9) indicated by the RU configuration information.

For example, in a case where the ending RU number is smaller than the starting RU number, STA 200 may perform communication control by using RUs from the starting RU number to the final RU number and RUs from the first RU number to the ending RU number. In contrast, for example, in a case where the RU length from the starting RU number to the final RU number (e.g., referred to as first RU length) is shorter than the RU length indicated by the RU assignment information (e.g., referred to as second RU length), STA 200 may perform the communication control by using RUs from the starting RU number to the final RU number and RUs from the first RU number to the RU number of the range of (second RU length-first RU length).

As a configuration example in FIG. 22, a case will be described where the starting RU is 7 and the ending RU is 3 (6 in the case of RU length). In this case, a position of the ending RU is smaller than a position of the starting RU. Therefore, STA 200, for example, may configure, as an RU assignment range, the range from the starting RU (RU #7) to the final RU (RU #9 in FIG. 22) and the range from the head (in other words, first) RU (RU #1 in FIG. 22) to the ending RU (RU #3).

Meanwhile, when the RU length is indicated by the RU assignment information, for example, STA 200 may calculate the ending RU as follows:

$$\text{Ending RU}=\text{mod}(\text{starting RU}+\text{RU length}-1,\text{number of all RUs}).$$

In the example of FIG. 22, ending RU=mod (7+6−1, 9)=3, for example. In other words, in the example of FIG. 22, six RUs are allocated to STA 200, the six RUs being a sum of three RUs from starting RU #7 to final RU #9 and three RUs from first RU #1 to RU #3 which corresponds to the range of the remaining three RUs among the indicated RU lengths 6.

According to Determination Method 2, the wraparound method enables assignment of non-contiguous RUs in the frequency domain, thereby improving the scheduling flexibility.

<Determination Method 3>

Figure 23:
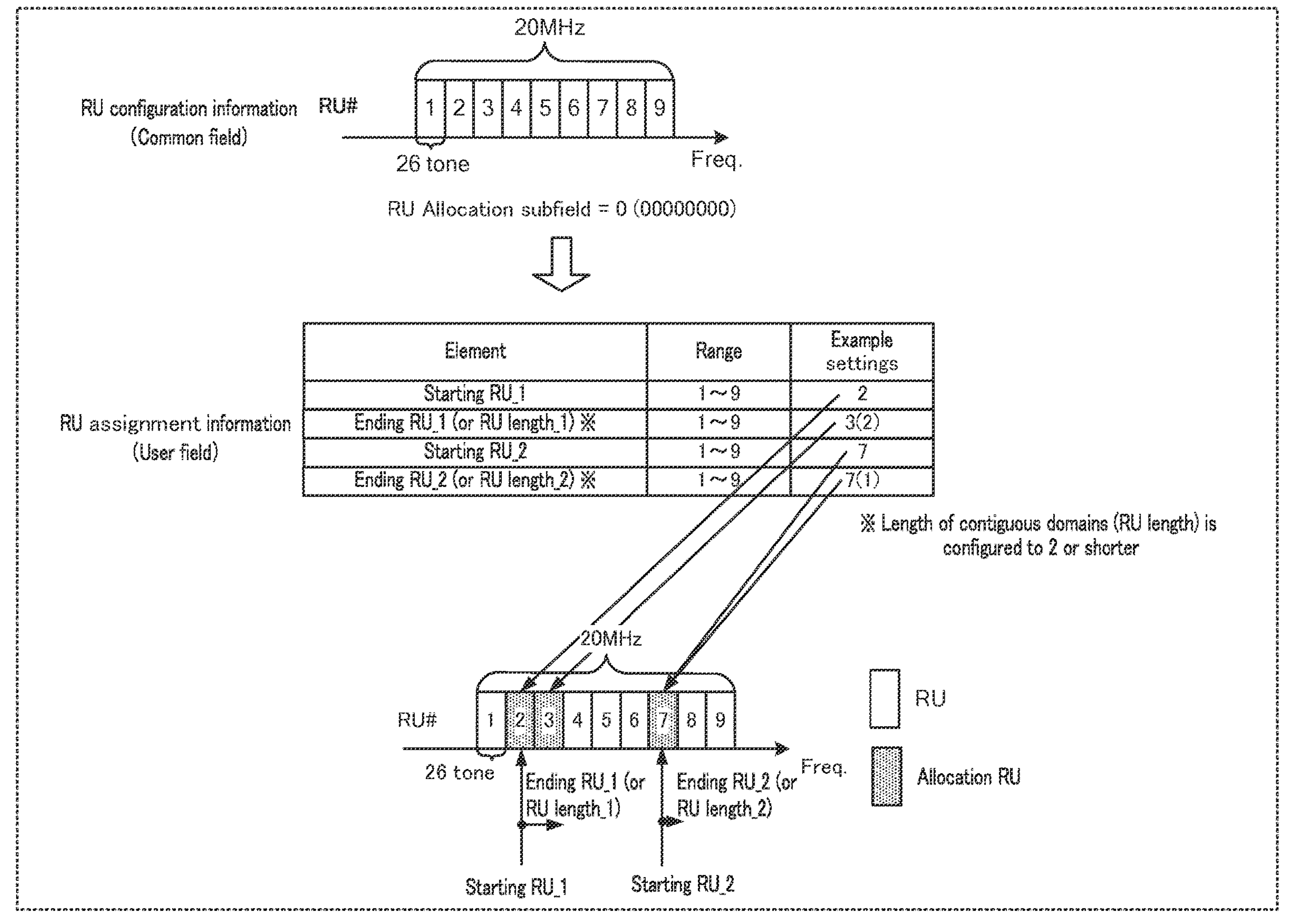
FIG. 23 illustrates still another RU assignment example according to Method 8.

FIG. 23 illustrates exemplary RU configuration information, RU assignment information, and RU assignment results according to Determination Method 3.

The RU assignment information illustrated in FIG. 23 may include, for example, a plurality of combinations (two pairs in FIG. 23) of a starting RU and an ending RU (or RU length) of RUs to be allocated to STA 200. In other words, a plurality of contiguous regions (e.g., may be also referred to as cluster) in the frequency domain may be indicated by the RU assignment information.

Among the plurality of RUs for STA 200, a length of the contiguous regions in the frequency domain (e.g., number of RUs, RU length, or RU size) may be configured to, for example, a specified value (e.g., two RUs) or less.

For example, in FIG. 23, the range of the starting RU and the ending RU (or RU length) may be configured to the range of RUs (e.g., 1 to 9) indicated by the RU configuration information.

As a configuration example in FIG. 23, a case will be described where the starting RU_1 is 2, the ending RU_1 is 3 (2 in the case of RU length), the starting RU_2 is 7, and the ending RU_2 is 7 (1 in the case of RU length).

As illustrated in FIG. 23, non-contiguous RUs of RUs #2, #3, and #7 can be allocated to one STA 200. In addition, an RU length of the region composed of RU #2 and RU #3 is two RUs and an RU length of the region composed of RU #7 is one RU, both of which are equal to or less than the specified value two RUs.

According to Determination Method 3, RUs can be allocated to non-contiguous regions in the frequency domain, thereby improving the scheduling flexibility. Further, for example, in Determination Method 3, configuring an RU length to a specified value or less makes it possible to suppress an increase in the number of signaling bits.

Determination Methods 1 to 3 have been each described, thus far.

Thus, according to Method 8, AP 100 indicates the starting RU and the ending RU (or RU length) of the RUs allocated to STA 200 by the RU assignment information of the User field. Further, STA 200 (e.g., user) determines the actual assigned RUs according to the specified rule for the RU numbers indicated by the RU assignment information. According to Method 8, it is possible to suppress an increase in the signaling amount related to the RU assignment, thereby improving throughput.

For example, in FIG. 21 (Determination Method 1) and FIG. 22 (Determination Method 2), since the range of the starting RU and the ending RU (or RU length) is 1 to 9, the number of bits of each of the starting RU and the ending RU (or RU length) is four bits, and the number of signaling bits of the RU assignment information in each User field is eight bits. Thus, an increase in the number of signaling bits of the RU assignment information illustrated in FIG. 21 and FIG. 22 is 23 bits fewer than an increase in the number of signaling bits (e.g., increase by 31 bits) in the above-mentioned method (e.g., FIG. 6).

Further, for example, in FIG. 23 (Determination Method 3), since the range of the starting RU and the ending RU (or RU length) is 1 to 9, and the length of the contiguous domains (RU length) is set to 2 or less, the number of bits of the starting RU is four bits, and the number of bits of the RU length is one bit. Hence, the number of signaling bits in the RU assignment information of each User field illustrated in FIG. 23 is 5 2=10 bits. Thus, an increase in the number of signaling bits of the RU assignment information illustrated in FIG. 23 is 21 bits fewer than an increase in the number of signaling bits (e.g., increase by 31 bits) in the above-mentioned method (e.g., FIG. 6).

Methods 1 to 8 have been each described, thus far.

As described above, according to the present embodiment, AP 100, for example, transmits RU assignment information on a plurality of RUs for one STA 200 in RU candidates (i.e., resource assignment candidates) and controls the communication using RU based on the RU assignment information. On the other hand, STA 200, for example, receives the RU assignment information on the plurality of RUs in the RU candidates (i.e., resource assignment candidates) and controls the communication using RU based on the RU assignment information.

In the manner described above, AP 100 can allocate, for example, a plurality of RUs (e.g., contiguous RUs or non-contiguous RUs) to one STA 200 in the RU assignment information in one User field corresponding to subject-STA 200. Hence, according to the present embodiment, for example, as compared to the above-mentioned method (e.g., FIG. 6), it is possible to suppress an increase in the number of signaling bits oaf User field, thereby improving throughput. Thus, according to the present embodiment, it is possible to allocate a plurality of RUs to one STA 200 while suppressing an increase in the signaling amount, thereby improving the assignment efficiency for a frequency resource.

The embodiment of the present disclosure has been described, thus far.

Other Embodiments

In the above-mentioned embodiment, a case has been described where the RU configuration information is included in a Common field and the RU assignment information is included in a User field, but the present disclosure is not limited to this case. For example, the RU configuration information may be included in a User field for DL. In other words, a Common field may not include the RU configuration information.

Further, in the above-mentioned embodiment, the same RU assignment method (i.e., RU designation method) may be applied to both DL and UL.

By way of example, a Trigger frame in UL OFDMA may be extended in order to include plural pieces of RU combination information in a Per User Info field. Further, a format similar to the extended Trigger frame in UL OFDMA may be applied to DL OFDMA.

As another example, with respect to UL OFDMA, as in the format of DL OFDMA illustrated in FIG. 12, the RU configuration information (e.g., RU configuration information: size and position of each RU) within a channel band may be indicated in the common information for STA (e.g., Common field), and the RU assignment information (e.g., RU assignment information) composed of a plurality of RU numbers included the RU configuration may be indicated in a single piece of user-specific information (e.g., User field). Further, for example, a Common Info of a Trigger frame may include the RU configuration information similar to that in DL. This reduces the size of User Info information, thereby reducing an overhead of the entire signaling.

Further, parameters such as a frequency bandwidth and an RU combination described in the above-mentioned embodiment is exemplary, and similar methods as in the above-mentioned embodiment can be applied to a frequency bandwidth and an RU combination different from the exemplary frequency bandwidth and RU combination. For example, for the frequency bandwidth, any of 20 MHz, 40 MHz, 80 MHz, 160 MHz, 240 MHz, and 320 MHz may be configured, or another frequency bandwidth may be configured. For the RU combination, in one example, a plurality of RUs of at least one of 26-tone RU, 52-tone RU, 106-tone RU, 242-tone RU, 484-tone RU, and 996-tone RU may be combined. Note that, the RU size is not limited to these and may be another size.

Although the descriptions in the above embodiment are based on the format of IEEE 802.11be as an example, an exemplary embodiment of the present disclosure is not limited to being applied to the format of IEEE 802.11be. An exemplary embodiment of the present disclosure can be applied to, for example, IEEE 802.11bd (Next Generation V2X (NGV)), which is a next generation standard of the 802.11p standard for a vehicular environment.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers. RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an exemplary embodiment of the present disclosure includes: reception circuitry, which, in operation, receives first information on a plurality of resource units in resource assignment candidates, and control circuitry, which, in operation, controls communication using at least one of the plurality of resource units, based on the first information.

In an exemplary embodiment of the present disclosure, the reception circuitry receives second information on the resource assignment candidates in a user common field of signaling and receives the first information in a user-specific field of the signaling.

In an exemplary embodiment of the present disclosure, the first information includes bitmap information indicating the presence or absence of assignment in the resource assignment candidates.

In an exemplary embodiment of the present disclosure, the first information includes information on any one of a plurality of combinations of the resource assignment candidates.

In an exemplary embodiment of the present disclosure, the first information includes information for identifying at least one of the plurality of combinations and a mapping of a resource unit corresponding to the at least one of the plurality of combinations in a frequency domain.

In an exemplary embodiment of the present disclosure, the reception circuitry receives second information indicating the resource assignment candidates and the plurality of combinations in a user common field of signaling; and the first information includes information for identifying the at least one of the plurality of combinations.

In an exemplary embodiment of the present disclosure, the first information includes information indicating whether a combination of the resource assignment candidates is used for assignment.

In an exemplary embodiment of the present disclosure, the reception circuitry receives third information indicating a configuration of the first information; and the control circuitry controls the communication, according to the configuration indicated by the third information.

In an exemplary embodiment of the present disclosure, the reception circuitry receives a beacon including second information on the resource assignment candidates.

In an exemplary embodiment of the present disclosure, the resource assignment candidates are previously configured for the terminal or are defined by standards.

In an exemplary embodiment of the present disclosure, the first information is configured in each of a first user-specific field and a second user-specific field, the first user-specific field being directed to the terminal and received by the reception circuitry, the second user-specific field being directed to another terminal.

In an exemplary embodiment of the present disclosure, the first information includes information indicating a starting resource unit number and an ending resource unit number in a frequency domain; and the control circuitry controls the communication by using resource units having cyclically shifted resource unit numbers from the starting resource unit number to the ending resource unit number.

In an exemplary embodiment of the present disclosure, the first information includes information indicating a starting resource unit number and an ending resource unit number in a frequency domain; and the control circuitry controls the communication by using resource units from the starting resource unit number to a final resource unit number and resource units from a first resource unit number to the ending resource unit number, in a case where the ending resource unit number is smaller than the starting resource unit number.

In an exemplary embodiment of the present disclosure, among the plurality of resource units, a number of resource units contiguous in a frequency domain is equal to or less than a specified value.

A base station according to an exemplary embodiment of the present disclosure includes: transmission circuitry, which, in operation, transmits first information on a plurality of resource units in resource assignment candidates, and control circuitry, which, in operation, controls communication using at least one of the plurality of resource units, based on the first information.

A communication method according to an exemplary embodiment of the present disclosure includes: receiving, by a terminal, first information on a plurality of resource units in resource assignment candidates; and controlling, by the terminal, communication using at least one of the plurality of resource units, based on the first information.

A communication method according to an exemplary embodiment of the present disclosure includes: transmitting, by a base station, first information on a plurality of resource units for one terminal among resource assignment candidates; and controlling, by the base station, communication using at least one of the plurality of resource units, based on the first information.

The disclosure of Japanese Patent Application No. 2020-044072, filed on Mar. 13, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 AP
101, 204 controller
102, 206 Data transmission processor
103, 207 Assigner
104, 202 Radio transceiver
105, 201 Antenna
106, 203 Extractor
107, 205 Data reception processor
200 STA

The invention claimed is:

1. A communication apparatus comprising:

a receiver, which, in operation, receives a trigger frame containing a user information field which includes a Resource Unit (RU) allocation information and first information, the user information field identifying a RU combination of more than one RU by indicating a size and a location of the more than one RU, wherein the RU allocation information and the first information jointly identify an RU combination, wherein the RU allocation information indicates an RU combination index corresponding to one of RU assignment candidates in a defined list of RU configuration information; and a transmitter, which, in operation, transmits an uplink signal using RUs indicated by the identified RU combination.

2. The communication apparatus according to claim 1, wherein the trigger frame contains a common information field and a user specific field which contains a plurality of user information fields, the user information field being one of the plurality of user information fields.

3. The communication apparatus according to claim 2, wherein the trigger frame contains second information which specifies an RU assignment method, and the communication apparatus switches a definition of the RU allocation information based on the RU assignment method.

4. The communication apparatus according to claim 3, wherein the user field includes a RU allocation subfield containing the RU allocation information and an allocation type subfield containing the first information.

5. The communication apparatus according to claim 4, wherein the user field includes an association identifier (AID) subfield identifying the communication apparatus which the indicated RUs are assigned to.

6. A communication method for a communication apparatus, the method comprising:

receiving a trigger frame containing a user information field which includes a Resource Unit (RU) allocation information and first information, the user information field identifying a RU combination of more than one RU by indicating a size and a location of the more than one RU, wherein the RU allocation information and the first information jointly identify an RU combination, wherein the RU allocation information indicates an RU combination index corresponding to one of RU assignment candidates in a defined list of RU configuration information; and transmitting an uplink signal using RUs indicated by the identified RU combination.

7. The communication method according to claim 6, wherein the trigger frame contains a common information field and a user specific field which contains a plurality of user information fields, the user information field being one of the plurality of user information fields.

8. The communication method according to claim 7, wherein the trigger frame contains second information which specifies an RU assignment method, and the communication apparatus switches a definition of the RU allocation information based on the RU assignment method.

9. The communication method according to claim 8, wherein the user field includes a RU allocation subfield containing the RU allocation information and an allocation type subfield containing the first information.

10. The communication method according to claim 9, wherein the user field includes an association identifier (AID) subfield identifying the communication apparatus which the indicated RUs are assigned to.

11. The communication method of claim 9, wherein the information indicating the configuration type indicates a size of an RU.

12. The communication apparatus of claim 4, wherein the information indicating the configuration type indicates a size of an RU.

* * * * *